(12) United States Patent
Kawabata

(10) Patent No.: US 8,286,054 B2
(45) Date of Patent: Oct. 9, 2012

(54) SEMICONDUCTOR MEMORY, OPERATING METHOD OF SEMICONDUCTOR MEMORY, AND SYSTEM

(75) Inventor: Kuninori Kawabata, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 964 days.

(21) Appl. No.: 12/265,227

(22) Filed: Nov. 5, 2008

(65) Prior Publication Data
US 2009/0119567 A1 May 7, 2009

(30) Foreign Application Priority Data

Nov. 7, 2007 (JP) .................................. 2007-289783

(51) Int. Cl.
*G11C 29/00* (2006.01)
(52) U.S. Cl. .................... 714/763; 714/787; 714/800
(58) Field of Classification Search .................. 714/763, 714/753, 787, 800, 718, 758, 48, 6
See application file for complete search history.

(56) References Cited

U.S. PATENT DOCUMENTS

| 7,373,564 B2 * | 5/2008 | Kikutake et al. ............. 714/718 |
| 7,409,581 B2 * | 8/2008 | Santeler et al. ................ 714/6.1 |
| 7,949,928 B2 * | 5/2011 | Lee et al. ...................... 714/763 |

FOREIGN PATENT DOCUMENTS

| JP | 01-290200 | 11/1989 |
| JP | 2005-085357 | 3/2005 |

* cited by examiner

*Primary Examiner* — Fritz Alphonse
(74) *Attorney, Agent, or Firm* — Fujitsu Patent Center

(57) ABSTRACT

In a write operation, an error of regular data read from a regular memory cell is detected and corrected using parity data. A part of the corrected regular data is replaced with write data, to thereby generate new parity data. When write commands are supplied, the parity data starts to be read from a parity memory cell after the read of the regular data is started and while the regular data is read. Further, while the new parity data is supplied to the parity memory cell, the regular data starts to be read from the regular memory cell in response to a following write command. Accordingly, an access cycle time of a semiconductor memory can be reduced.

20 Claims, 18 Drawing Sheets

SEMICONDUCTOR MEMORY, OPERATING METHOD OF SEMICONDUCTOR MEMORY, AND SYSTEM

CROSS-REFERENCE TO RELATED APPLICATION

This application is based upon and claims the benefit of priority from Japanese Patent Application No. 2007-289783, filed on Nov. 7, 2007, the entire contents of which are incorporated herein by reference.

BACKGROUND

1. Field

The present embodiments relate to a semiconductor.

2. Description of the Related Art

Japanese Laid-open Patent Publication No. H01-290200 and Japanese Laid-open Patent Publication No. 2005-85357 disclose a semiconductor memory having an error correction circuit. The error correction circuit enables to relieve a soft error and a hard error.

SUMMARY

According to one aspect of embodiments, a semiconductor memory is provided which includes a plurality of regular memory cells holding regular data written therein, a regular data control circuit inputting or outputting the regular data to or from the regular memory cells, a parity memory cell holding parity data of the regular data, a parity data control circuit inputting or outputting the parity data to or from the parity memory cell, an error correction unit being coupled to the regular data control circuit and the parity data control circuit, detecting and correcting an error of the regular data read from the regular memory cells using the regular data read from the regular memory cell and the parity data read from the parity memory cell in a write operation, replacing a part of corrected regular data with write data, and generating the parity data from the replaced regular data to write into the parity memory cell, and an access control circuit generating regular access control signals controlling the regular memory cells and the regular data control circuit to read the regular data from the regular memory cells and write the regular data into the regular memory cells when write commands are supplied, generating parity access control signals controlling the parity memory cell and the parity data control circuit to start a read of the parity data from the parity memory cell after the regular data starts to be read from the regular memory cell and during the read of the regular data, and generating the regular access control signals to read the regular data from the regular memory cells in response to a following write command during when the parity data to be written into the parity memory cell is supplied to the parity memory cell.

DETAILED DESCRIPTION OF THE EMBODIMENTS

Figure 1:
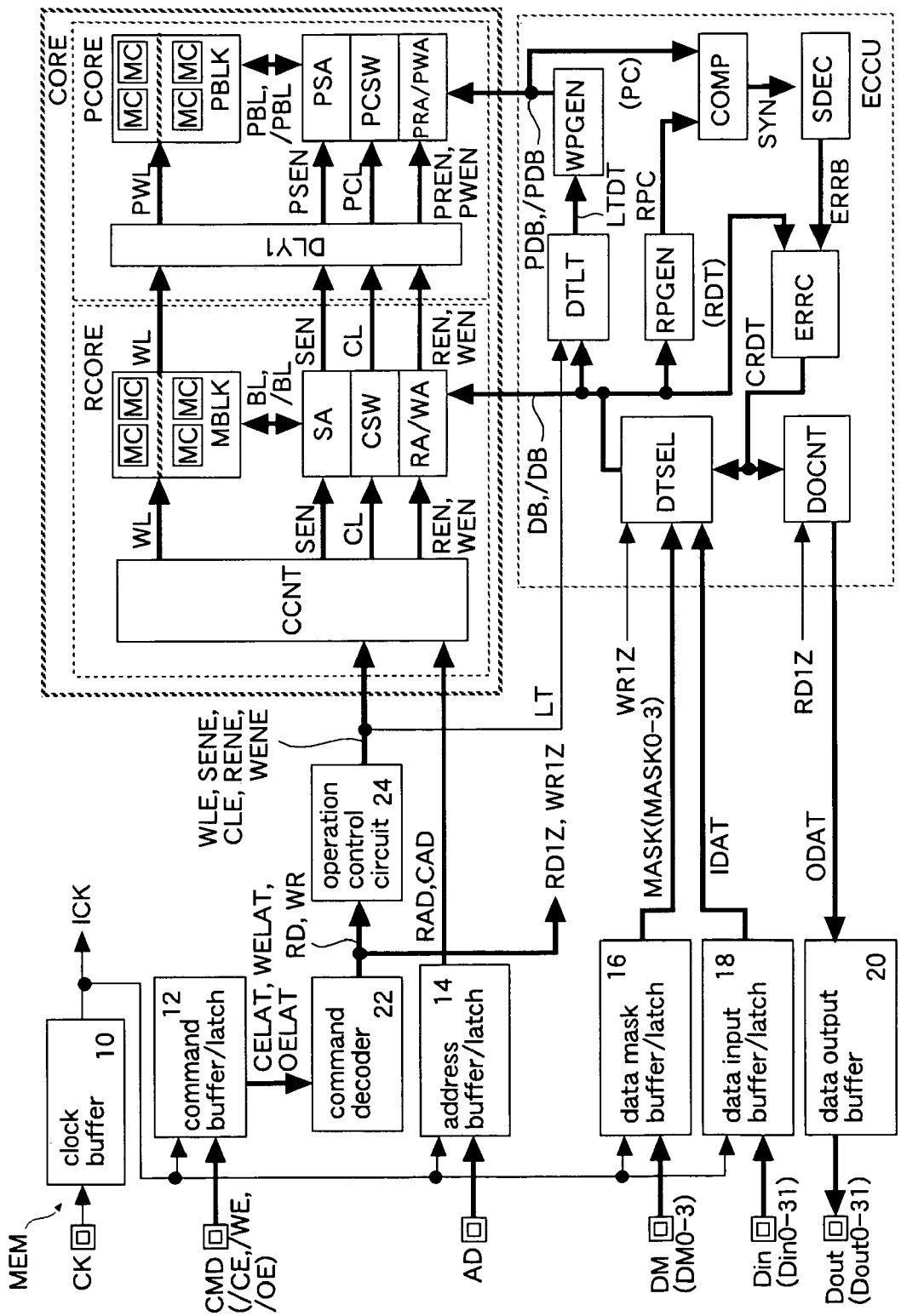
FIG. 1 illustrates one embodiment.

Each double square in the drawings represents an external terminal. The external terminal is a pad formed on a semiconductor chip or a lead of package mounted the semiconductor chip. Each signal supplied through the external terminal is denoted same reference symbol as terminal name. Each signal line through which the signal is transmitted is denoted by the same reference symbol as the signal name. Each signal starting with "/" represents negative logic.

FIG. 1 illustrates one embodiment. A semiconductor memory MEM is, for example, an FCRAM (Fast Cycle RAM) of clock synchronous type. This FCRAM is a pseudo SRAM having a memory cell of a DRAM and an input/output interface of an SRAM. The memory MEM has a clock buffer 10, a command buffer/latch 12, an address buffer/latch 14, a data mask buffer/latch 16, a data input buffer/latch 18, a data output buffer 20, a command decoder 22, an operation control circuit 24, a memory core CORE and an error correction unit ECCU. Note that, in order to automatically execute a refresh operation, the memory MEM has a refresh timer, a refresh address counter, an arbiter determining an order of precedence between external access requests RD and WR and an internal refresh request, and the like.

The clock buffer 10 outputs a clock signal CK as an internal clock signal ICK. The internal clock signal ICK is supplied to a circuit such as the command buffer/latch 12 and the operation control circuit 24, which operates in synchronization with the clock signal CK.

The command buffer/latch 12 latches a command signal CMD in synchronization with a rising edge of the internal clock signal ICK, and outputs the latched signal. The command signal CMD includes a chip enable signal/CE, a write enable signal/WE, and an output enable signal/OE. Latch signals CELAT, WELAT, and OELAT are signals generated by latching the signals /CE, /WE, and /OE, respectively.

The address buffer/latch 14 latches an address signal AD in synchronization with the rising edge of the internal clock signal ICK, and outputs the latched signal as a row address signal RAD and a column address signal CAD. The row address signal RAD is supplied to select a later-described word line WL. The column address signal CAD is supplied to select later-described bit lines BL, /BL. This memory MEM is an address non-multiplex type memory in which the row address signal RAD and the column address signal CAD are simultaneously supplied to an address terminal AD.

The data mask buffer/latch 16 latches a data mask signal DM in synchronization with the rising edge of the internal clock signal ICK, and outputs the latched signal as a mask signal MASK. For example, each of the data mask signal DM and the mask signal MASK has 4 bits (DM0-3, MASK0-3). The data mask signals DM0-3 are respectively supplied to corresponding 4-byte data input signals Din0-7, Din8-15, Din16-23, and Din24-31. When the data input signal Din (write data to the memory MEM) is masked, namely, when the data input signal Din is disabled to be written into a regular memory cell MC, the corresponding data mask signal DM and the mask signal MASK are set at a high level. In the description hereinafter, the respective data input signals Din0-7, Din8-15, Din16-23, and Din24-31 are also referred to as a data group.

The data input buffer/latch 18 latches the data input signal Din in synchronization with the rising edge of the internal clock signal ICK, and outputs the latched signal as a data input signal IDAT. For instance, the data input signal Din has four data groups Din0-7, Din8-15, Din16-23, and Din24-31.

The data output buffer 20 receives a data output signal ODAT (read data from the memory core CORE), and outputs the received signal as a data output signal Dout. For example, the data output signal Dout has four data groups Dout0-7, Dout8-15, Dout16-23, and Dout24-31. In the description hereinafter, 32 bits may be referred to as a standard N-bit width.

The command decoder 22 outputs the command CMD recognized in accordance with a logic level of the latch signals CELAT, WELAT, and OELAT, as a read command signal RD and a write command signal WR in order to execute an access operation to the memory core CORE. The read command signal RD and the write command signal WR are access commands (access requests) to access the memory core CORE. In addition, the command decoder 22 outputs a read control signal RD1Z being a timing signal to operate a later-described data output control circuit DOCNT and a write control signal WR1Z being a timing signal to operate a later-described data selection circuit DTSEL.

The operation control circuit 24 outputs a word enable signal WLE, a sense amplifier enable signal SENE, a column enable signal CLE, a read enable signal RENE, a write enable signal WENE, and a not-illustrated precharge enable signal to execute a read operation and a write operation to the memory core CORE in response to the read command RD and the write command WR. When performing the refresh operation, the operation control circuit 24 outputs only the word enable signal WLE, the sense amplifier enable signal SENE, and the precharge enable signal, and does not output the column enable signal CLE, the read enable signal RENE, and the write enable signal WENE. The word enable signal WLE controls an activation timing of the word line WL, and the sense amplifier enable signal SENE controls an activation timing of a sense amplifier SA. The column enable signal CLE controls an on-timing of a column switch CSW. The read enable signal RENE controls an activation timing of a read amplifier RA. The write enable signal WENE controls an activation timing of a write amplifier WA.

The memory core CORE has a regular memory core RCORE and a parity memory core PCORE. The regular memory core RCORE has a core control circuit CCNT, a regular memory block MBLK, a regular sense amplifier SA, a regular column switch CSW, a regular read amplifier RA, and a regular write amplifier WA. The regular sense amplifier SA, the regular column switch CSW, the regular read amplifier RA, and the regular write amplifier WA are directly or electrically coupled to regular bit lines BL, /BL, and operate as a regular data control circuit inputting or outputting regular data to or from the regular memory cell MC via the regular bit lines BL, /BL.

Figure 2:
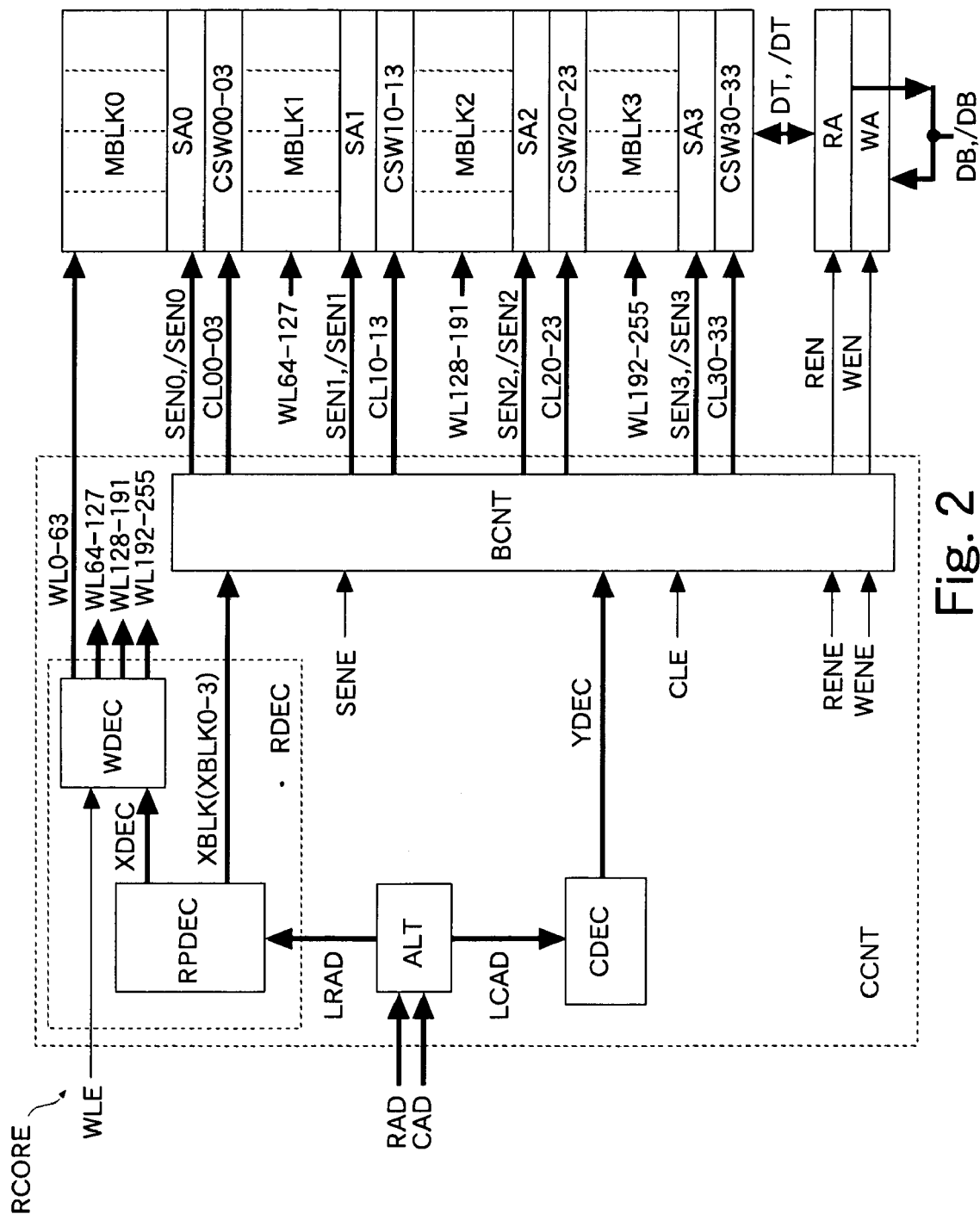
FIG. 2 illustrates a regular memory core in FIG. 1.
Figure 3:
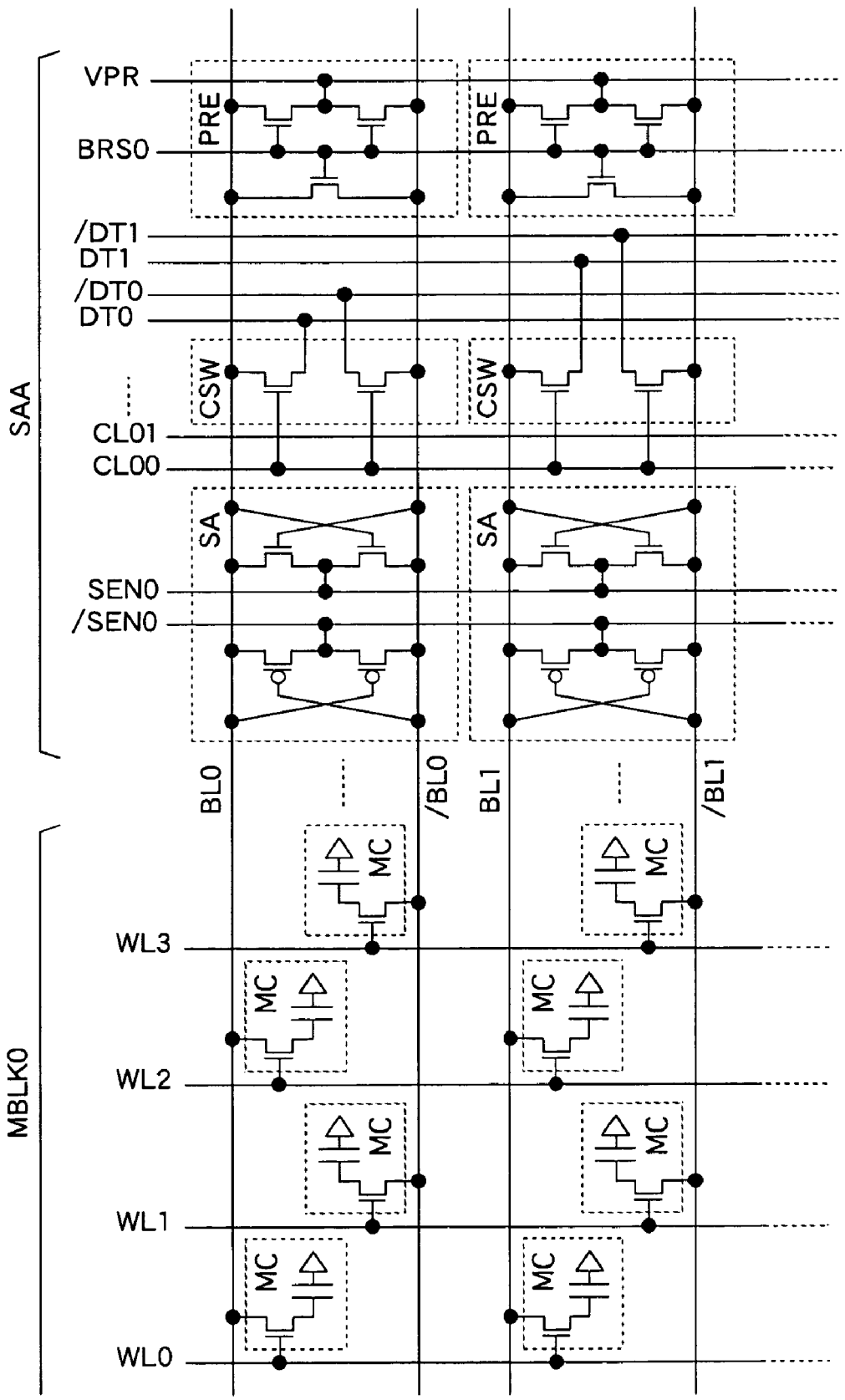
FIG. 3 illustrates a regular memory block and a sense amplifier area in FIG. 1.

The core control circuit CCNT receives the control signals WLE, SENE, and CLE, the address signals RAD and CAD, and the not-illustrated precharge enable signal, and outputs a word line signal WL corresponding to the address signals RAD and CAD, a sense amplifier activation signal SEN, a column control signal CL, and a precharge control signal (BRS0 in FIG. 3, for example). Further, the core control circuit CCNT outputs a read amplifier activation signal REN and a write amplifier activation signal WEN in response to the control signals RENE and WENE. The word line signal WL is a regular access control signal controlling an operation of the regular memory cell MC. In like manner, the sense amplifier activation signal SEN, the column control signal CL, the read amplifier activation signal REN, the write amplifier activation signal WEN, and the precharge control signal BRS (BRS0) in FIG. 3 are the regular access control signals controlling operations of the regular sense amplifier SA, the regular column switch CSW, the regular read amplifier RA, the regular write amplifier WA and a precharge circuit PRE in FIG. 3. Specifically, the core control circuit CCNT operates as a regular signal generation circuit generating the regular access control signals. Details of the core control circuit CCNT are illustrated in FIG. 2.

The memory block MBLK has a plurality of dynamic memory cells MC disposed in a matrix shape. The regular memory cell MC holds regular data written therein from an exterior of the semiconductor memory MEM via a data input terminal Din. For example, the memory block MBLK has four memory blocks MBLK0-3, as illustrated in FIG. 2. The sense amplifier SA operates in a high level period of the sense amplifier activation signal SEN, and amplifies a data signal read to a regular bit line pair BL, /BL from the regular memory cell MC. For instance, the memory block MBLK has 128 sets of bit line pairs BL, /BL. Namely, 128 regular memory cells MC are coupled to one word line WL. The sense amplifier SA is coupled to the respective bit line pair BL, /BL. As such, the regular memory core RCORE has 4N-bit width.

The column switch CSW is turned on in a high level period of the column control signal CL, and couples 32 sets (1N) of the bit line pairs BL, /BL and 32 (1N) sense amplifiers SA to the read amplifier RA and the write amplifier WA in accordance with the column address signal CAD. There are 256 column switches CSW corresponding to the 256 bit line pairs BL, /BL. The read amplifier RA operates in a high level period of the read amplifier activation signal REN, amplifies a complementary read data signal transmitted from the sense amplifier SA, and outputs it to regular data buses DB, /DB. For instance, the read amplifier RA differentially amplifies the read data signal. The regular data buses DB, /DB has 32 sets of complementary signal lines. The write amplifier WA amplifies a write data signal transmitted from the regular data buses DB, /DB, and outputs it to the sense amplifier SA. For example, the write amplifier WA differentially amplifies a complementary write data signal from the regular data buses DB, /DB. For instance, there are 32 read amplifiers RA and 32 write amplifiers WA. Details of the sense amplifier SA and the column switch CSW are illustrated in FIG. 3.

Note that in FIG. 1, the sense amplifier activation signal SEN, the column control signal CL, the read amplifier activation signal REN, and the write amplifier activation signal WEN output from the sense amplifier SA, the column switch CSW, the read amplifier RA, and the write amplifier WA indicate that the signals output from the core control circuit CCNT are transmitted to the parity memory core PCORE via the sense amplifier SA, the column switch CSW, the read amplifier RA, and the write amplifier WA.

The parity memory core PCORE has a delay circuit DLY1, a parity memory block PBLK, a parity sense amplifier PSA, a parity column switch PCSW, a parity read amplifier PRA, and a parity write amplifier PWA. The parity sense amplifier PSA, the parity column switch PCSW, the parity read amplifier PRA, and the parity write amplifier PWA are electrically coupled to parity bit lines PBL, /PBL, and operate as a parity data control circuit inputting and outputting parity data to and from a parity memory cell MC via the parity bit lines PBL, /PBL.

Figure 4:
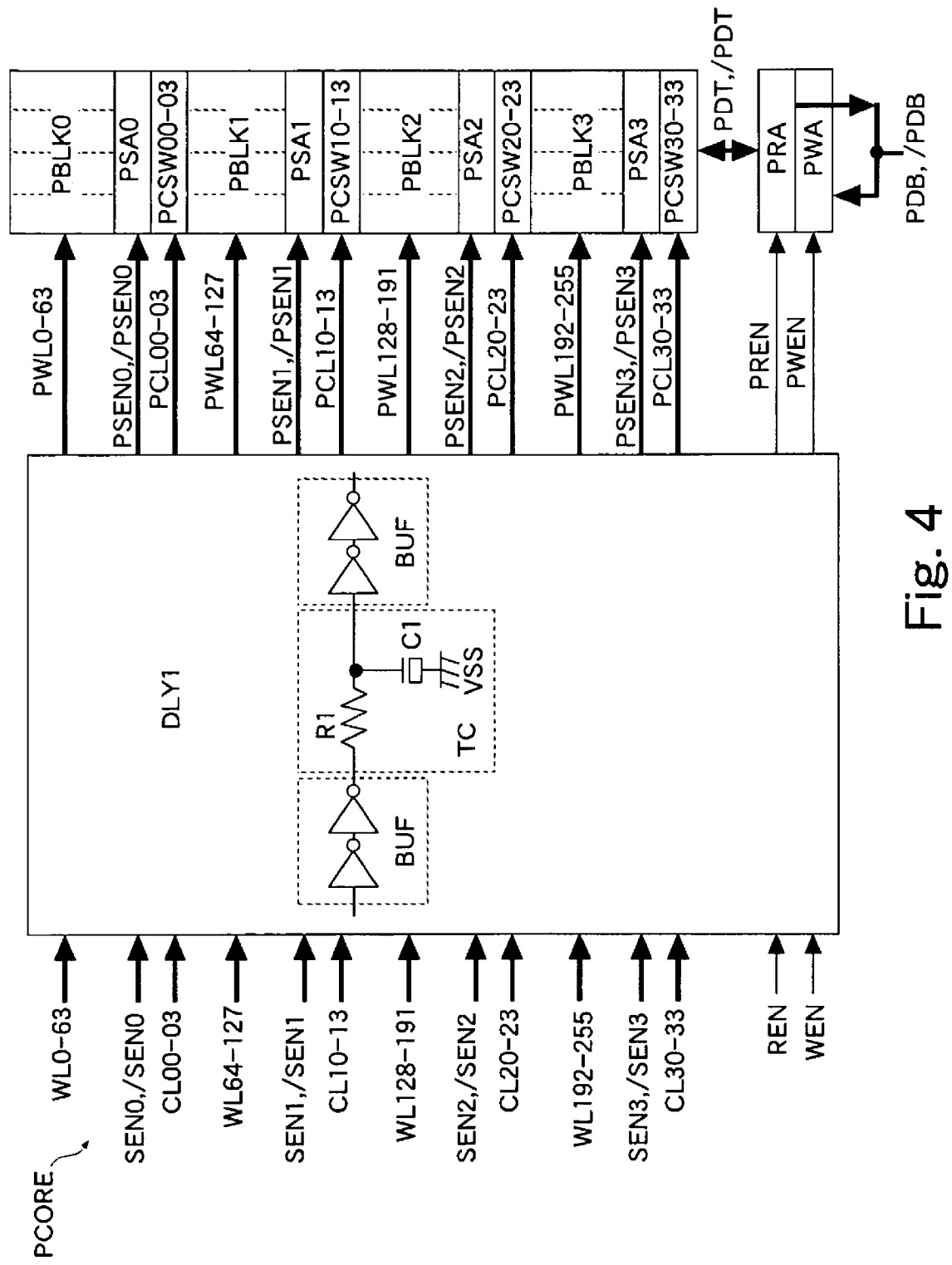
FIG. 4 illustrates a parity memory core in FIG. 1.

The delay circuit DLY1 delays the word line signal transmitted to the word line WL, the sense amplifier activation signal SEN, the column control signal CL, the read amplifier activation signal REN, and the write amplifier activation signal WEN, and outputs them as a parity word line signal transmitted to a parity word line PWL, a parity sense amplifier activation signal PSEN, a parity column control signal PCL, a parity read amplifier activation signal PREN, and a parity write amplifier activation signal PWEN. The parity word line signal PWL is a parity access control signal controlling an operation of the parity memory cell MC. In like manner, the parity sense amplifier activation signal PSEN, the parity column control signal PCL, the parity read amplifier activation signal PREN, the parity write amplifier activation signal PWEN, and a not-illustrated parity precharge signal are the parity access control signals controlling operations of the parity sense amplifier PSA, the parity column switch PCSW, the parity read amplifier PRA, the parity write amplifier PWA and a not-illustrated parity precharge circuit. Details of the delay circuit DLY1 are illustrated in FIG. 4.

The parity memory block PBLK has a plurality of dynamic memory cells MC being disposed in a matrix shape and holding parity codes of the regular data. For instance, the parity memory block PBLK has four parity memory blocks PBLK0-3, as illustrated in FIG. 4. The parity memory block PBLK has the same circuit configuration as that of the regular memory block MBLK except that the number of parity memory cells MC disposed in a lateral direction in the drawing is smaller. Concretely, the number of sets of the parity bit lines PBL, /PBL coupled to the parity memory cell MC is, for example, 24. Namely, 24 parity memory cells MC are coupled to one parity word line PWL. The parity sense amplifier PSA is coupled to the respective parity bit line pair BL, /BL. Note that in order to match with the configuration of the regular memory block MBLK, the parity memory block PBLK may be configured by 32 sets of the parity bit line pairs PBL, /PBL. Details of the parity memory block PBLK are illustrated in FIG. 4.

The parity sense amplifier PSA and the parity column switch PCSW have the same circuit configurations as those of the regular sense amplifier SA and the regular column switch CSW except that the number thereof to be disposed is smaller. The parity read amplifier PRA and the parity write amplifier PWA have the same circuit configurations as those of the regular read amplifier RA and the regular write amplifier WA except that the number thereof to be disposed is smaller. For instance, there are 24 parity sense amplifiers PSA in each of regions PSA0-3 illustrated in FIG. 4. There are 48 parity column switches PCSW in each of regions PCSW00-03, PCSW10-13, PCSW20-23, and PCSW30-33 illustrated in FIG. 4. The number of parity read amplifiers PRA and that of parity write amplifiers PWA are respectively six.

The parity read amplifier PRA operates in a high level period of the parity read amplifier activation signal PREN, amplifies a complementary parity code transmitted from the parity sense amplifier PSA, and outputs it to parity data buses PDB, /PDB. For instance, the parity read amplifier PRA differentially amplifies the parity code. The parity data buses PDB, /PDB has six sets of complementary signal lines. The parity write amplifier PWA differentially amplifies the parity code transmitted from the parity data buses PDB, /PDB, and outputs it to the parity sense amplifier PSA.

The operation control circuit 24, the core control circuit CCNT, and the delay circuit DLY1 operate as an access control circuit. As will be described later in FIG. 6, when the write commands WR are successively supplied, the access control circuit generates the regular access control signals WL, SEN, CL, REN, and WEN controlling the regular memory cell MC, the regular sense amplifier SA, the regular column switch CSW, the regular read amplifier RA, and the regular write amplifier WA, in order to read the regular data from the regular memory cell MC via the regular bit lines BL, /BL and write the regular data into the regular memory cell MC via the regular bit lines BL, /BL. The access control circuit generates the parity access control signals PWL, PSEN, PCL, PREN, and PWEN controlling the parity memory cell MC, the parity sense amplifier PSA, the parity column switch PCSW, the parity read amplifier PRA, and the parity write amplifier PWA, in order to start a read of the parity data from the parity memory cell MC to the parity bit lines PBL, /PBL after the regular data starts to be read from the regular memory cell MC to the regular bit lines BL, /BL, and during the read of the regular data. In addition, the access control circuit generates the regular access control signals WL, SEN, CL, REN, and WEN, in order to read the regular data from the regular memory cell MC via the regular bit lines BL, /BL in response to a following write command during when the parity data to be written into the parity memory cell MC is supplied to the parity bit lines PBL, /PBL.

The error correction unit ECCU has a read parity generation circuit RPGEN, a comparison circuit COMP, a syndrome decoder SDEC, an error correction circuit ERRC, a data output control circuit DOCNT, a data selection circuit DTSEL, a data latch DTLT, and a write parity generation circuit WPGEN.

For example, the read parity generation circuit RPGEN, the comparison circuit COMP, the syndrome decoder SDEC, and the error correction circuit ERRC operate in the write operation and in the read operation. The data selection circuit DTSEL, the data latch DTLT, and the write parity generation circuit WPGEN operate only in the write operation. The data output control circuit DOCNT operates only in the read operation. Note that, for example, when the memory MEM is designed to write a read data signal whose error is corrected in the read operation into the regular memory block MBLK, the data selection circuit DTSEL, the data latch DTLT, and the write parity generation circuit WPGEN operate also in the read operation.

The read parity generation circuit RPGEN generates a read parity code RPC from a read data signal RDT read from the regular memory block MBLK to the data buses DB, /DB. In the write operation and in the read operation, the comparison circuit COMP compares the read parity code RPC with a parity code PC read from the parity memory block PBLK to the parity data buses PDB, /PDB, and generates a syndrome SYN including error information on the read data. The syndrome decoder SDEC generates an error bit signal ERRB indicating an error bit in the read data based on the syndrome SYN. Specifically, the comparison circuit COMP and the error bit signal ERRB detect an error of the regular data read from the regular memory cell MC.

The error correction circuit ERRC corrects an error included in the read data signal RDT using the error bit signal ERRB, and outputs the corrected read data signal as a corrected read data signal CRDT. In the read operation, the data output control circuit DOCNT outputs the corrected read data signal CRDT as the data output signal ODAT in synchronization with the read control signal RD1Z.

The data selection circuit DTSEL selects, in the write operation, the corrected read data signal CRDT or the data input signal IDAT by each data group according to the mask signal MASK. Concretely, the corrected read data signal CRDT is selected for the data group which needs to be masked, and the data input signal IDAT is selected for byte data which does not need to be masked, in accordance with the mask signal MASK. Specifically, the data selection circuit DTSEL replaces the corrected read data signal CRDT of the data group from which the data group being disabled by the mask signal MASK to be written is excluded with the data input signal IDAT. For instance, when the mask signal MASK0 is activated, the data selection circuit DTSEL selects the data group of the corrected read data signal CRDT corresponding to the data group Din0-7, and selects the data input signals IDAT corresponding to the data groups Din8-15, Din 16-23, and Din24-31.

The data selection circuit DTSEL outputs the selected data signals to the data buses DB, /DB in synchronization with the write control signal WR1Z. The data signals on the data buses DB, /DB are written into the regular memory cell MC via the bit line pair BL, /BL. The data latch DTLT latches the data signals on the data buses DB, /DB in synchronization with the rising edge of the latch signal LT, and outputs the latched signals as latched data signals LTDT in a high level period of the latch signal LT. The write parity generation circuit WPGEN generates the parity code PC of the latched data signal LTDT, and outputs it to the parity data buses PDB, /PDB. The parity code PC on the parity data buses PDB, /PDB is written into the parity memory cell MC via the parity bit line pair PBL, /PBL.

FIG. 2 illustrates details of the regular memory core RCORE in FIG. 1. The core control circuit CCNT has an address latch circuit ALT, a row decoder RDEC, a column decoder CDEC, and a block control circuit BCNT. The address latch circuit ALT latches the row address signal RAD, and outputs it as a latched row address signal LRAD to the row decoder RDEC. In addition, the address latch circuit ALT latches the column address signal CAD, and outputs it as a latched column address signal LCAD to the column decoder CDEC.

The row decoder RDEC has a row predecoder RPDEC and a word decoder WDEC. The row predecoder RPDEC decodes the latched row address signal LRAD and generates a row decode signal XDEC and block decode signals XBLK (XBLK0-3). Either of the regular memory blocks MBLK0-3 is selected by the block decode signals XBLK0-3. The word decoder WDEC selects either of the word lines WL0-255 in accordance with the row decode signal XDEC, and activates the selected word line WL at a high level in response to the activation of the word enable signal WLE (activation of a regular word line signal). The column decoder CDEC decodes the latched column address signal LCAD, and outputs it as a column decode signal YDEC.

As illustrated in later-described FIG. 6, the word decoder WDEC operates as a regular access control circuit activating the word line signal WL in response to the following write command WR during the activation of the parity word line signal PWL.

The block control circuit BCNT activates either of the sense amplifier activation signals SEN (SEN0-3) corresponding to the memory blocks MBLK0-3 in response to the sense amplifier enable signal SENE. The selection of the sense amplifier activation signals SEN0-3 is conducted by the block decode signals XBLK0-3. The block control circuit BCNT activates either of the column control signals CL (CL00-03, 10-13, 20-23, and 30-33) in response to the column enable signal CLE. Either of four regions (regions divided by a dotted line in the drawing) of the memory block MBLK0 is selected by the column control signals CL00-03. In like manner, either of four regions of the memory block MBLK1 (MBLK2, or MBLK3) is selected by the column control signals CL10-13 (CL20-23, or CL30-33). 32 sets of the bit line pairs BL, /BL are wired in the respective regions, and by the activation of the word line WL, data of 32 bits is output or input from or to the respective regions. The column control signal CL is selected by the block decode signals XBLK0-3 and the column decode signal YDEC.

Although not illustrated in particular, the block control circuit BCNT outputs the precharge control signal (BRS0 in FIG. 3, for example) corresponding to the memory blocks MBLK0-3 in response to the precharge enable signal. Further, the block control circuit BCNT activates the read enable signal REN in response to the read enable signal RENE, and activates the write enable signal WEN in response to the write enable signal WENE.

The memory block MBLK has four regular memory blocks MBLK0-3, and four sense amplifier blocks SA0-3 and four column switch blocks CSW00-03, 10-13, 20-23, and 30-33 respectively corresponding to the memory blocks MBLK0-3. Each of the blocks SA0-3 has 32 sense amplifiers SA. Each of the blocks CSW00-03, 10-13, 20-23, and 30-33 has 64 column switches CSW. The sense amplifiers SA0-3 (32 sense amplifiers SA) and the memory blocks MBLK0-3 are coupled to 32 sets of complementary data lines DT, /DT via the column switches CSW00-03, 10-13, 20-23, and 30-33. Note that the memory core RCORE may adopt a shared sense amplifier system. Specifically, the sense amplifiers SA may be disposed on both sides of the respective memory blocks MBLK0-3, and the sense amplifier SA disposed between the two memory blocks MBLK may be shared by the memory blocks MBLK.

FIG. 3 illustrates details of the memory block MBLK0 illustrated in FIG. 2 and a sense amplifier area SM. The sense amplifier area SM is an area on which the sense amplifier SA, the column switch CSW, the precharge circuit PRE, and the like are disposed. The memory blocks MBLK1-3 and sense amplifier areas SM corresponding to these memory blocks MBLK1-3 are also the same as illustrated in FIG. 3. Further, the parity memory blocks PBLK0-3 illustrated in FIG. 4 and sense amplifier areas SM (area on which the PSA and the PCSW are disposed) corresponding to these parity memory blocks PBLK0-3 are also the same as illustrated in FIG. 3.

The regular memory cells MC coupled to the regular word lines WL (WL0, WL1, WL2, ... ) are coupled to either of the regular bit lines BL, /BL (BL0, /BL0, BL1, /BL1, ... ). Accordingly, when accessing the memory cell MC coupled to the bit line BL0, for example, the bit line /BL0 functions as a reference voltage line (precharge voltage VPR).

Each of the sense amplifiers SA has a pair of CMOS inverters in which an input and an output thereof are coupled to each other. The input of the respective CMOS inverters (gate of a transistor) is coupled to the bit line BL (or /BL). Each of the CMOS inverters has an nMOS transistor and a pMOS transistor arranged in a lateral direction in the drawing. A source of the pMOS transistor of the respective CMOS inverters receives a sense amplifier activation signal /SEN0. A source of the nMOS transistor of the respective CMOS inverters receives the sense amplifier activation signal SEN0. The sense amplifier activation signal /SEN0 is set at a high level voltage when the sense amplifier SA operates, and it is set to the precharge voltage VPR when the sense amplifier SA does not operate. The sense amplifier activation signal SEN0 is set at a low level voltage (ground voltage, for instance) when the sense amplifier SA operates, and it is set to the precharge voltage VPR when the sense amplifier SA does not operate.

Each of the column switches CSW has an nMOS transistor coupling the bit line BL to a data line DT (DT0, DT1, ...), and an nMOS transistor coupling the bit line /BL to a data line /DT (/DT0, /DT1, ...). A gate of the respective nMOS transistors receives the column switch signal CL (CL01, for instance). In the read operation, the read data signal on the bit lines BL, /BL amplified in the sense amplifier SA is transmitted to the data lines DT, /DT via the column switch CSW. In the write operation, the write data signal supplied via the data lines DT, /DT is written into the memory cell MC via the bit lines BL, /BL. The data lines DT, /DT are coupled to the read amplifier RA and the write amplifier WA, as illustrated in FIG. 2.

Each of the precharge circuits PRE has a pair of nMOS transistors to couple respective complementary bit lines BL, /BL to a precharge voltage line VPR, and an nMOS transistor to mutually couple the bit lines BL, /BL. A gate of the nMOS transistor of the precharge circuit PRE receives the precharge control signal BRS (BRS0) generated by each of the memory blocks MBLK0-3. During the time of receiving the precharge control signal BRS of a high logic level, the precharge circuit PRE supplies the precharge voltage VPR to the bit lines BL, /BL, and equalizes the voltage of the bit lines BL, /BL.

FIG. 4 illustrates details of the parity memory core PCORE in FIG. 1. The delay circuit DLY1 includes, for example, a resistor R1 and a capacitor C1, and has a time constant circuit TC coupled to the respective signal lines. The time constant circuit TC is disposed between two buffer circuits BUF each having a pair of inverters. Note that the delay circuit DLY1 is not limited to the circuit in FIG. 4. For example, a power supply terminal of the inverters configuring the buffer circuit BUF may be coupled to a power supply line via a resistor element. Alternatively, an on-resistance of the transistor configuring the inverter may be set high.

The delay circuit DLY1 delays the word line signals transmitted to the word lines WL0-255, and outputs them as delayed word line signals to the parity word lines PWL0-255. The delay circuit DLY1 delays the sense amplifier activation signals SEN0-3, /SEN0-3 to output them as the parity sense amplifier activation signals PSEN0-3, /PSEN0-3, and delays the column control signals CL00-03, CL10-13, CL20-23, and CL30-33 to output them as the parity column control signals PCL00-03, PCL10-13, PCL20-23, and PCL30-33. Either of four regions (regions divided by a dotted line in the drawing) of the parity memory block PBLK0 is selected by the parity column control signals PCL00-03. In like manner, either of four regions of the parity memory block PBLK1 (PBLK2, or PBLK3) is selected by the parity column control signals PCL10-13 (PCL20-23, or PCL30-33). For instance, six sets of the bit line pairs BL, /BL are wired in the respective regions, and by the activation of the word line WL, data (parity code PC) of 6 bits is output or input from or to the respective regions.

As illustrated in later-described FIG. 6, the delay circuit DLY1 generating the parity word line signal PWL operates as a parity access control circuit which activates the parity word line signal PWL for a predetermined period of time in response to the write command WR, and activates the parity word line signal PWL after the word line signal WL is activated and during the activation of the word line signal WL.

The parity memory block PBLK has four parity memory blocks PBLK0-3, and four parity sense amplifier blocks PSA0-3 and four parity column switch blocks PCSW0-3 respectively corresponding to the parity memory blocks PBLK0-3. The sense amplifiers PSA0-3 and the memory blocks PBLK0-3 are coupled to parity data lines PDT, /PDT via the column switches PCSW0-3. Note that when the shared sense amplifier system is adopted by the regular memory core RCORE, it is also adopted by the parity memory core PCORE.

The parity memory block PBLK0 operates by receiving the delayed word line signals transmitted to the parity word lines PWL0-63. In like manner, the parity memory block PBLK1 (PBLK2, or PBLK3) operates by receiving the delayed word line signals transmitted to the parity word lines PWL64-127 (PWL128-191, or PWL192-255). The parity sense amplifier PSA0 operates by receiving the parity sense amplifier activation signal PSEN0 supplied via the delay circuit DLY1. In like manner, the parity sense amplifier PSA1 (PSA2, or PSA3) operates by receiving the parity sense amplifier activation signal PSEN1 (PSEN2, or PSEN3) supplied via the delay circuit DLY1. The parity column switch PCSW0 operates by receiving the parity column control signals PCL00-03 supplied via the delay circuit DLY1. In like manner, the parity column switch PCSW1 (PCSW2, or PCSW3) operates by receiving the parity column control signals PCL10-13 (PCL20-23, or PCL30-33) supplied via the delay circuit DLY1.

Figure 5:
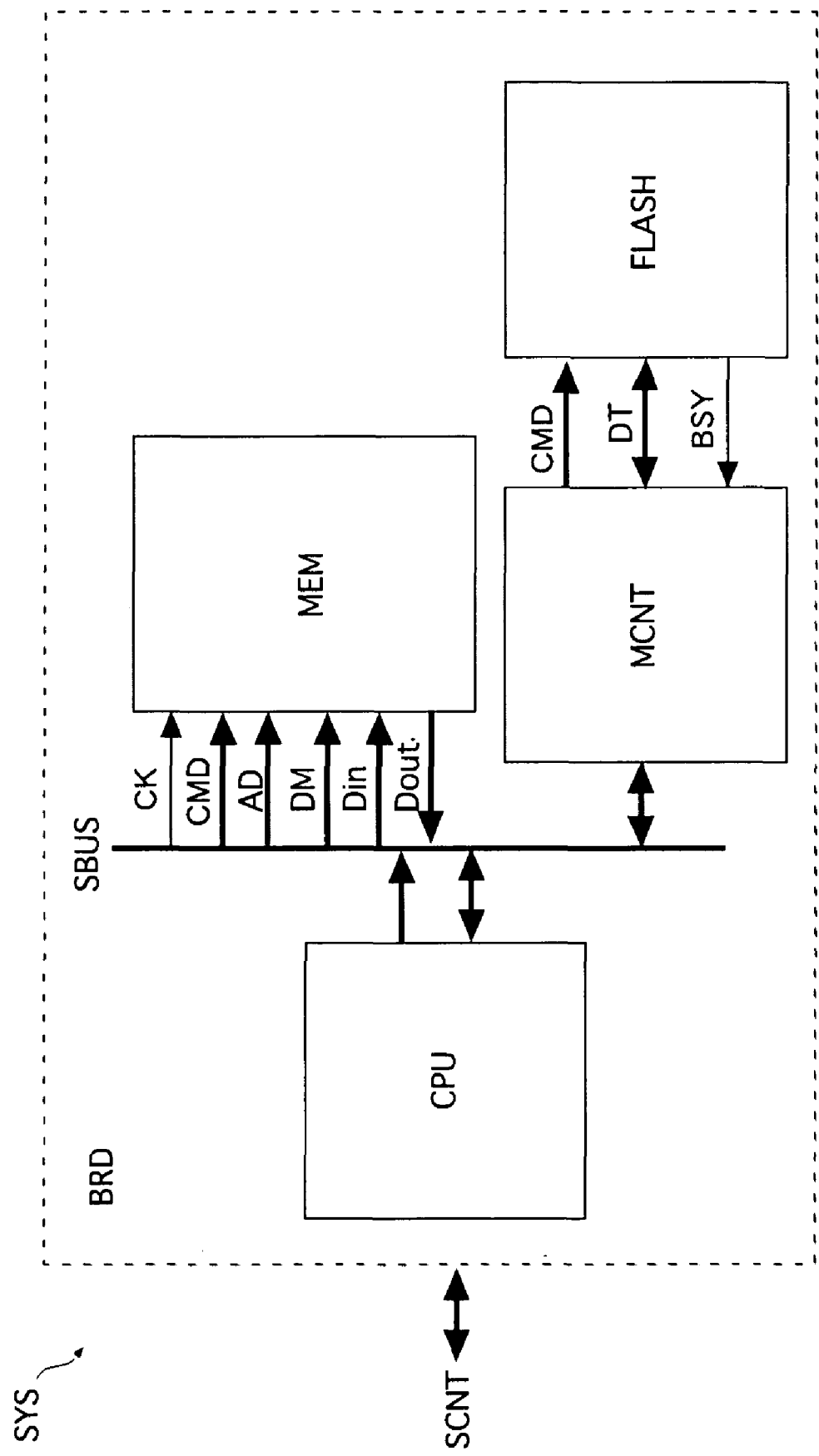
FIG. 5 illustrates a system in which a semiconductor memory in FIG. 1 is mounted.

FIG. 5 illustrates a system SYS in which the semiconductor memory MEM in FIG. 1 is mounted. The system SYS has, for instance, a system in package SIP integrated on a silicon substrate. The system SYS is, for example, a portable equipment such as a mobile phone.

The SIP has the memory MEM illustrated in FIG. 1, a flash memory FLASH, a memory controller MCNT controlling an access to the flash memory FLASH, and a CPU accessing the memory MEM and the flash memory FLASH. The flash memory FLASH stores a program to realize a function of the portable equipment and nonvolatile various parameters. At the time of power-on, the memory MEM holds a program transferred from the flash memory FLASH, and holds work data, and the like to be handled during the execution of the program. The program held in the memory MEM is executed by the CPU.

The CPU, the memory MEM, and the memory controller MCNT are coupled to one another by a system bus SBUS. The SIP is coupled to a system controller SCNT via an external bus. The CPU outputs the command signal CMD, the address signal AD, and the data input signal Din (write data signal) to access the memory MEM, and receives the data output signal Dout (read data signal) from the memory MEM. The SIP operates as a memory system.

Figure 6:
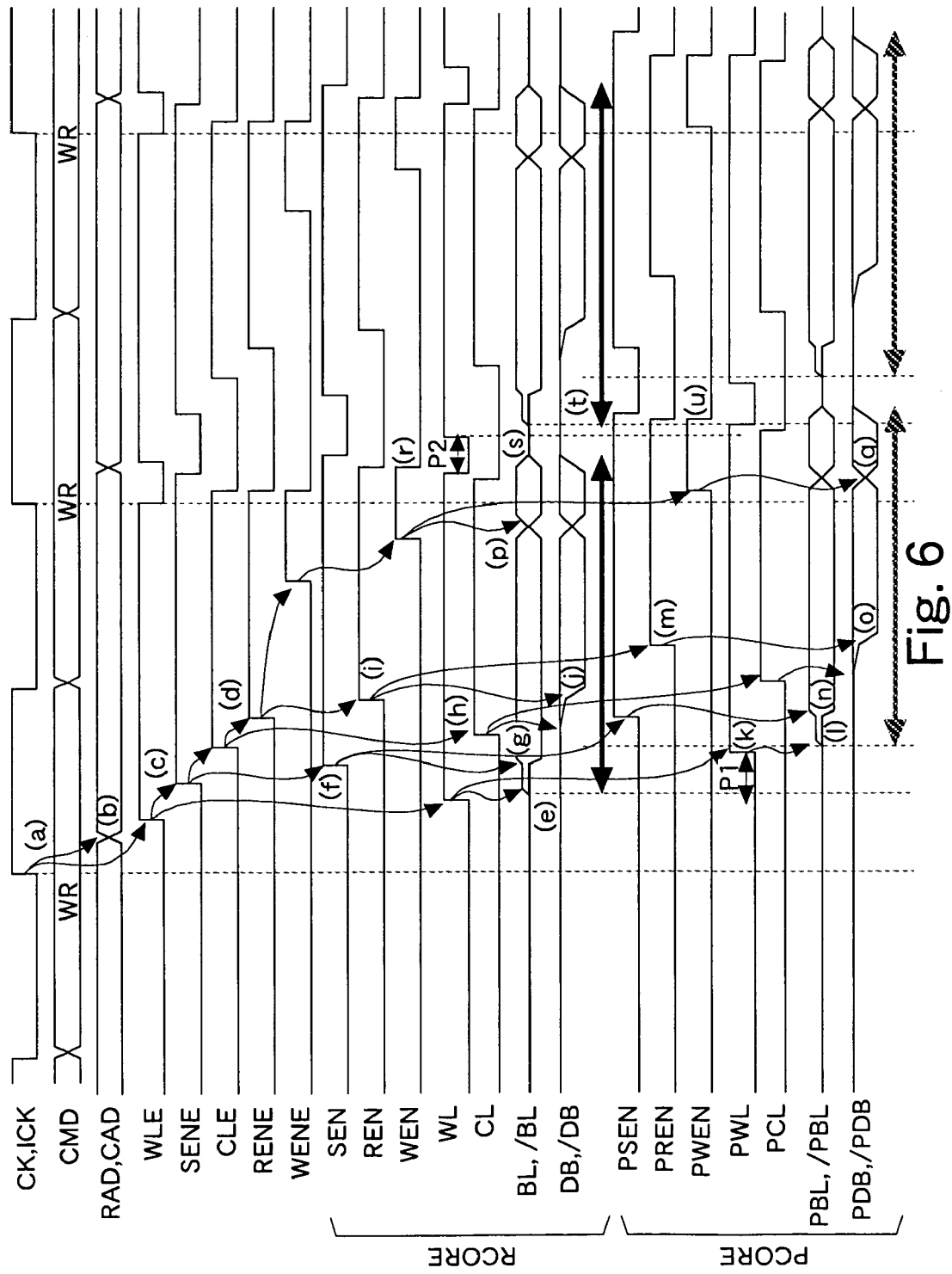
FIG. 6 illustrates an example of a write operation to the semiconductor memory in FIG. 1.

FIG. 6 illustrates an example of the write operation to the memory MEM illustrated in FIG. 1. In this example, the write commands WR are successively supplied. A bold arrow in the drawing indicates a period during which the regular data is read from the regular memory cell MC to the regular bit lines BL, /BL, or a period during which the regular data is written into the regular memory cell MC from the regular bit lines BL, /BL. A bold dotted arrow in the drawing indicates a period during which the parity data is read from the parity memory cell MC to the parity bit lines PBL, /PBL, or a period during which the parity data is written into the parity memory cell MC from the parity bit lines PBL, /PBL. Specifically, the bold arrow indicates a write operation period (execution period of a read-modify-write). In this example, a length of the write operation period of the regular memory core RCORE and that of the parity memory core PCORE are equivalent to each other. The write operation period of the parity memory core PCORE is delayed with respect to the write operation period of the regular memory core RCORE, and the write operation periods of the memory cores RCORE and PCORE are overlapped with each other.

The memory MEM receives the write command WR, the not-illustrated address signal AD, and the write data signal Din in synchronization with the rising edge of the clock signal CK (FIG. 6(a)). The clock signal CK is generated in the SIP illustrated in FIG. 5, or supplied from the system controller SCNT. The write command WR, the address signal AD, and the write data signal Din are output from, for example, the CPU illustrated in FIG. 5. The write command WR is recognized by the low-level chip enable signal /CE, the low-level write enable signal /WE, and the high-level output enable signal /OE.

The address buffer/latch 14 illustrated in FIG. 1 latches the address signal AD in synchronization with the rising edge of the clock signal CK, and outputs as the row address signal RAD and the column address signal CAD (FIG. 6(b)). The operation control circuit 24 activates the word enable signal WLE in response to the rising edge of the clock signal CK which receives the write command WR (FIG. 6(c)). Thereafter, in response to the activation of the word enable signal WLE, the sense amplifier enable signal SENE, the column enable signal CLE, the read enable signal RENE, and the write enable signal WENE are sequentially activated (FIG. 6(d)).

In the regular memory core RCORE, the word line WL selected by the row address signal RAD is changed to high level in response to the word enable signal WLE, and the read data signal is output from the regular memory cell MC coupled to the word line WL to the bit line BL (or /BL) (FIG. 6(e)). The sense amplifier activation signal SEN selected by the block decode signal XBLK is activated in response to the sense amplifier enable signal SENE (FIG. 6(f)). The sense amplifier SA corresponding to either of the memory blocks MBLK0-3 starts its operation in synchronization with the activation of the sense amplifier activation signal SEN, and amplifies a voltage difference on the bit line pair BL, /BL (FIG. 6(g)).

The column control signal CL selected by the column decode signal YDEC is activated in response to the column enable signal CLE (FIG. 6(h)). In synchronization with the activation of the column control signal CL, the corresponding column switch CSW is turned on, and the read data signal amplified in the sense amplifier SA is transmitted to the not-illustrated data lines DT, /DT. The read enable signal REN is activated in response to the activation of the read enable signal RENE (FIG. 6(i)). The read amplifier RA amplifies the read data signal on the data buses DB, /DB in synchronization with the activation of the read enable signal REN (FIG. 6(j)).

The read parity generation circuit RPGEN illustrated in FIG. 1 generates the read parity code RPC (not illustrated) of the read data signal read to the data buses DB, /DB. After the read parity generation circuit RPGEN starts generating the read parity code RPC, the parity word line PWL is activated by being delayed from the activation of the word line WL (FIG. 6(k)).

Here, the activation period (high level period) of the regular word line signal WL and the activation period (high level period) of the parity word line signal PWL are set to be equivalent to each other. A period P1 from the activation of the regular word line signal WL to the activation of the parity word line signal PWL is set longer than an inactivation period P2 of the regular word line signal WL when the write commands WR are successively supplied. The period P1 is equivalent to a delay time of the delay circuit DLY1.

Further, a sum of the period P1 and the activation period of the parity word line signal PWL is set longer than an interval of the activation timing (rising edge) of the regular word line signal WL being successively activated when the write commands WR are continuously supplied. In other words, the sum of the period P1 and the activation period of the parity word line signal PWL is set longer than the sum of the activation period and the inactivation period P2 of the regular word line signal WL.

In the parity memory core PCORE, the parity code is output from the parity memory cell MC coupled to the activated parity word line PWL to the parity bit line PBL (or /PBL) (FIG. 6(l)). Next, the parity sense amplifier activation signal PSEN, the parity column control signal PCL, the parity read enable signal PREN, and the parity write enable signal PWEN are sequentially activated by being delayed from the sense amplifier activation signal SEN, the read enable signal REN, and the write enable signal WEN by the delay time of the delay circuit DLY1 (FIG. 6(m)). The parity sense amplifier PSA corresponding to either of the parity memory blocks PBLK0-3 starts its operation in synchronization with the activation of the parity sense amplifier activation signal PSEN, and amplifies a voltage difference on the parity bit line pair PBL, /PBL (FIG. 6(n)).

In synchronization with the activation of the parity column control signal PCL, the corresponding parity column switch PCSW is turned on, and the parity code amplified in the parity sense amplifier PSA is transmitted to the not-illustrated parity data lines PDT, /PDT. The parity read amplifier PRA amplifies a signal level of the parity code PC on the parity data buses PDB, /PDB in synchronization with the activation of the parity read enable signal PREN (FIG. 6(o)). Thereafter, although not illustrated in particular, the syndrome SYN is generated from the read parity code RPC and the parity code PC, and the error bit ERRB is detected. When the error bit ERRB exists, an error of the read data signal is corrected.

The data selection circuit DTSEL illustrated in FIG. 1 selects the corrected read data signal or the data input signal (write data signal) supplied to the data input terminal Din by each data group based on a logic of the mask signal MASK, and outputs it to the data buses DB, /DB. The data signal (write data signal) supplied to the data buses DB, /DB is written into the regular memory cell MC via the write amplifier WA and the bit line pair BL, /BL in synchronization with the activation of the write enable signal WENE (FIG. 6(p)).

After the write data signal starts to be written into the regular memory cell MC, the write parity generation circuit WPGEN generates a new parity code PC of the write data signal received via the data latch DTLT. The new parity code PC is written into the parity memory cell MC via the parity write amplifier PWA and the parity bit line pair PBL, /PBL in synchronization with the activation of the parity write enable signal PWEN (FIG. 6(q)). While the new parity code PC is written into the parity memory cell MC, the column control signal CL, the word line WL, the read enable signal REN, the write enable signal WEN, and the sense amplifier activation signal SEN are sequentially inactivated (FIG. 6(r)). Subsequently, the bit line pair BL, /BL is precharged, thereby completing the write operation to the regular memory core RCORE (FIG. 6(s)).

Next, before the write operation to the parity memory core PCORE is completed, the word line WL is activated in response to the second write command WR, and the second write operation to the regular memory core RCORE is started in the same manner as described above (FIG. 6(t)). Concretely, during when the new parity code PC is written into the parity memory cell MC via the parity bit lines PBL, /PBL, the regular data is read from the regular memory cell MC to the regular bit lines BL, /BL in response to the following write command WR. In other words, before the parity word line PWL is inactivated, the regular word line WL is activated in response to the following write command WR.

The parity column control signal PCL, the parity read enable signal PREN, the parity write enable signal PWEN, the parity word line PWL, and the parity sense amplifier activation signal PSEN are sequentially inactivated after the second write operation to the regular memory core RCORE is started (FIG. 6(u)). Thereafter, the same operations as described above are repeated.

In the write operation of this embodiment, in order to set the write operation period of the regular memory core RCORE and that of the parity memory core PCORE to the minimum, the write operation periods are overlapped with each other, and the operation of the regular memory core RCORE is started during the write operation period of the parity memory core PCORE. Accordingly, it is possible to make a write cycle time (access cycle time) of the memory MEM be substantially equivalent to an actual operation time of the regular memory core RCORE and the parity memory core PCORE. Specifically, the access cycle time of the memory MEM which requires the read-modify-write for the error correction can be reduced. In this example, the write cycle time is one clock cycle, which is the minimum supply interval of the write command WR. As a result of this, a data transfer rate of the memory MEM can be improved, which results in enhancing a performance of the system SYS in which the memory MEM is mounted.

Figure 7:
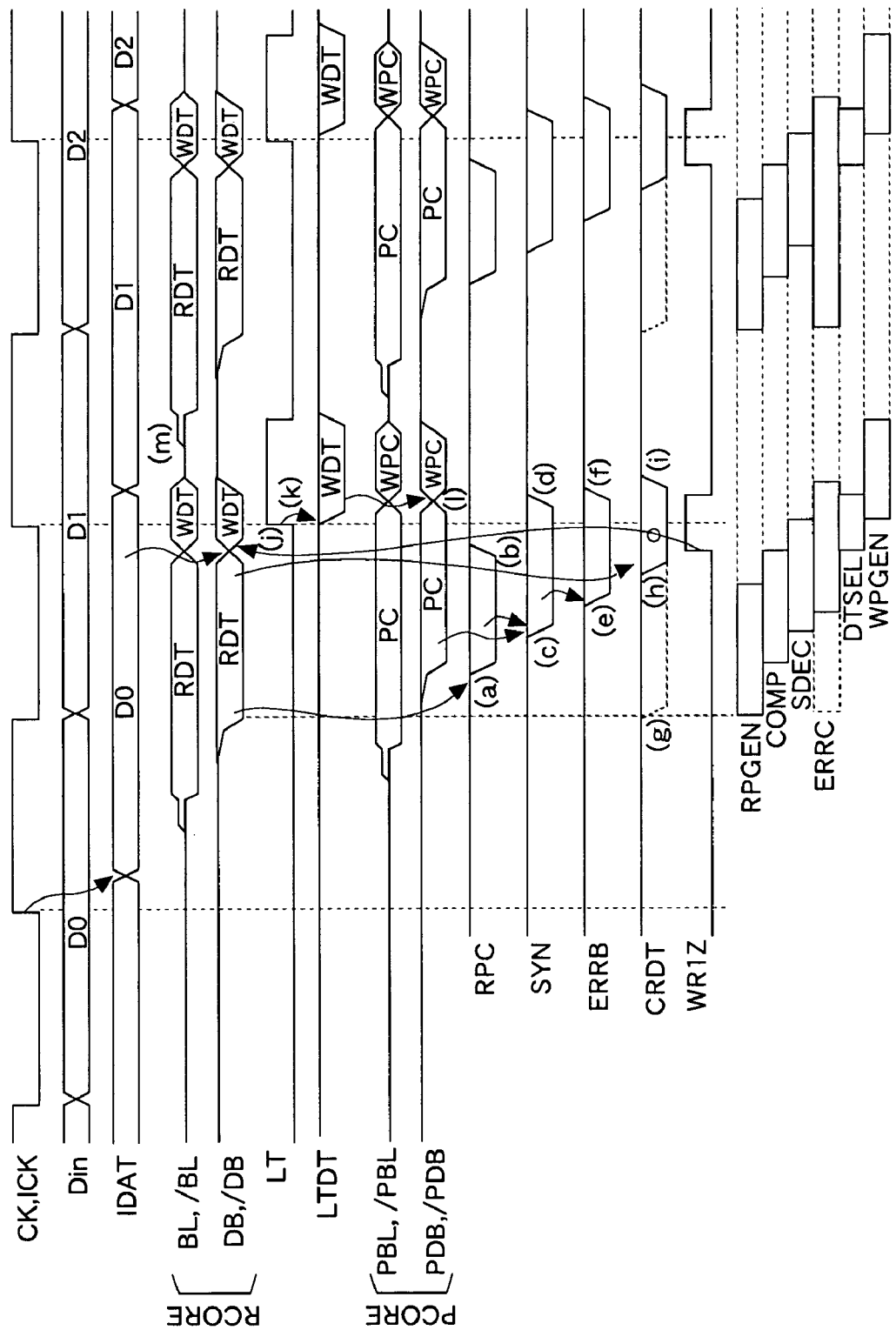
FIG. 7 illustrates an error correction operation in the write operation in FIG. 6.

FIG. 7 illustrates details of an error correction operation in the write operation illustrated in FIG. 6. In this example, the write data signals Din (D0, D1, and D2) are supplied to the memory MEM in synchronization with the three write commands WR illustrated in FIG. 6. Quadrangles being long from side to side illustrated at the bottom of the drawing indicate the operation periods of the respective circuits RPGEN, COMP, SDEC, ERRC, DTSEL, and WPGEN in the error correction unit ECCU.

When either bit of the complementary read data signals RDT on the data buses DB, /DB is changed from a high level (invalid level) to a low level (valid level), the read parity generation circuit RPGEN starts its operation in synchronization with the change, and generates the read parity code RPC (complementary data) using the read data signal RDT (FIG. 7(a)). The read parity generation circuit RPGEN starts the operation without receiving the control signal by utilizing the change to the low level of the read data signal RDT on the data buses DB, /DB.

The parity memory core PCORE starts its operation by being delayed from the regular memory core RCORE. For this reason, when the read parity generation circuit RPGEN starts the operation, the parity read amplifier RPA is not in operation. The read parity generation circuit RPGEN stops its operation when all the read data signals RDT on the data buses DB, /DB change to high level, and sets the read parity code RPC at high level (FIG. 7(b)).

The parity read amplifier RPA starts its operation substantially at the same time when the output of the read parity code RPC is started from the read parity generation circuit RPGEN, and differentially amplifies the parity code PC transmitted from the parity memory cell MC to complementary parity data buses PDB, /PDB. As such, the parity memory core PCORE starts the operation by being delayed from the regular memory core RCORE by a time of generating the read parity code RPC with the read parity generation circuit RPGEN. In other words, the delay time of the delay circuit DLY1 illustrated in FIG. 4 is set to be equivalent to the time of generating the read parity code RPC with the read parity generation circuit RPGEN.

When either bit of complementary read parity codes RPC and complementary parity codes PC is changed from a high level (invalid level) to a low level (valid level), the comparison circuit COMP starts its operation in synchronization with the change, and generates the syndrome SYN (complementary signal) using the read parity code RPC and the complementary parity code PC (FIG. 7(c)). The syndrome SYN includes information indicating an error bit included in the read data signal RDT. Specifically, the comparison circuit COMP detects an error of the read data signal RDT. The comparison circuit COMP stops the operation when all the read parity codes RPC and the parity codes PC change to high level, and sets the syndrome SYN at high level (FIG. 7(d)).

When either bit of the complementary syndromes SYN is changed from a high level (invalid level) to a low level (valid level), the syndrome decoder SDEC starts its operation in synchronization with the change, and generates a complementary error bit signal ERRB using the syndrome SYN (FIG. 7(e)). The syndrome decoder SDEC stops the operation when all the syndromes SYN change to high level, and sets the error bit signal at high level (FIG. 7(f)).

When either bit of the complementary read data signals RDT on the data buses DB, /DB is changed from a high level (invalid level) to a low level (valid level), the error correction circuit ERRC starts its operation in synchronization with the change. At this time, since the error bit signal ERRB is at high level, the error correction circuit ERRC outputs the read data signal RDT whose error is not corrected as the corrected read data signal CRDT (FIG. 7(g)). When either bit of the complementary error bit signals ERRB is changed from a high level (invalid level) to a low level (valid level), the error correction circuit ERRC inverts the bit corresponding to the read data signal RDT, and outputs it as the corrected read data signal CRDT (FIG. 7(h)). Specifically, the error of the read data signal RDT is corrected. When all the error bit signals ERRB are at high level, there is no error in the read data signal RDT. At this time, the error correction circuit ERRC maintains the output of the corrected read data signal CRDT which is started at the time of FIG. 7(g). The error correction circuit ERRC stops the output of the corrected read data signal CRDT when all the levels of the data buses DB, /DB and the error bit signals ERRB become high level (FIG. 7(i)).

The data selection circuit DTSEL operates in a high level period of the write control signal WR1Z, selects the data input signal IDAT or the corrected read data signal CRDT by each data group according to the mask signal MASK, and outputs the selected signal as a complementary write data signal WDT to the data buses DB, /DB (FIG. 7(j)). The data latch DTLT outputs the write data signal WDT as a complementary latched data signal LTDT in a high level period of the latch signal LT (FIG. 7(k)). When either bit of the latched data signals LTDT is changed from a high level (invalid level) to a low level (valid level), the write parity generation circuit WPGEN starts its operation in synchronization with the change, generates the parity code PC using the latched data signal LTDT, and outputs it as a write parity code WPC to the parity data buses PDB, /PDB (FIG. 7(l)).

Thereafter, the write data signal WDT is transmitted to the parity data buses PDB, /PDB and to the parity bit lines PBL, /PBL, and during the execution of the write operation to the parity memory core PCORE, the regular memory core RCORE starts the following write operation in response to the following write command WR (FIG. 7(m)). After that, the same operations as described above are executed.

Figure 8:
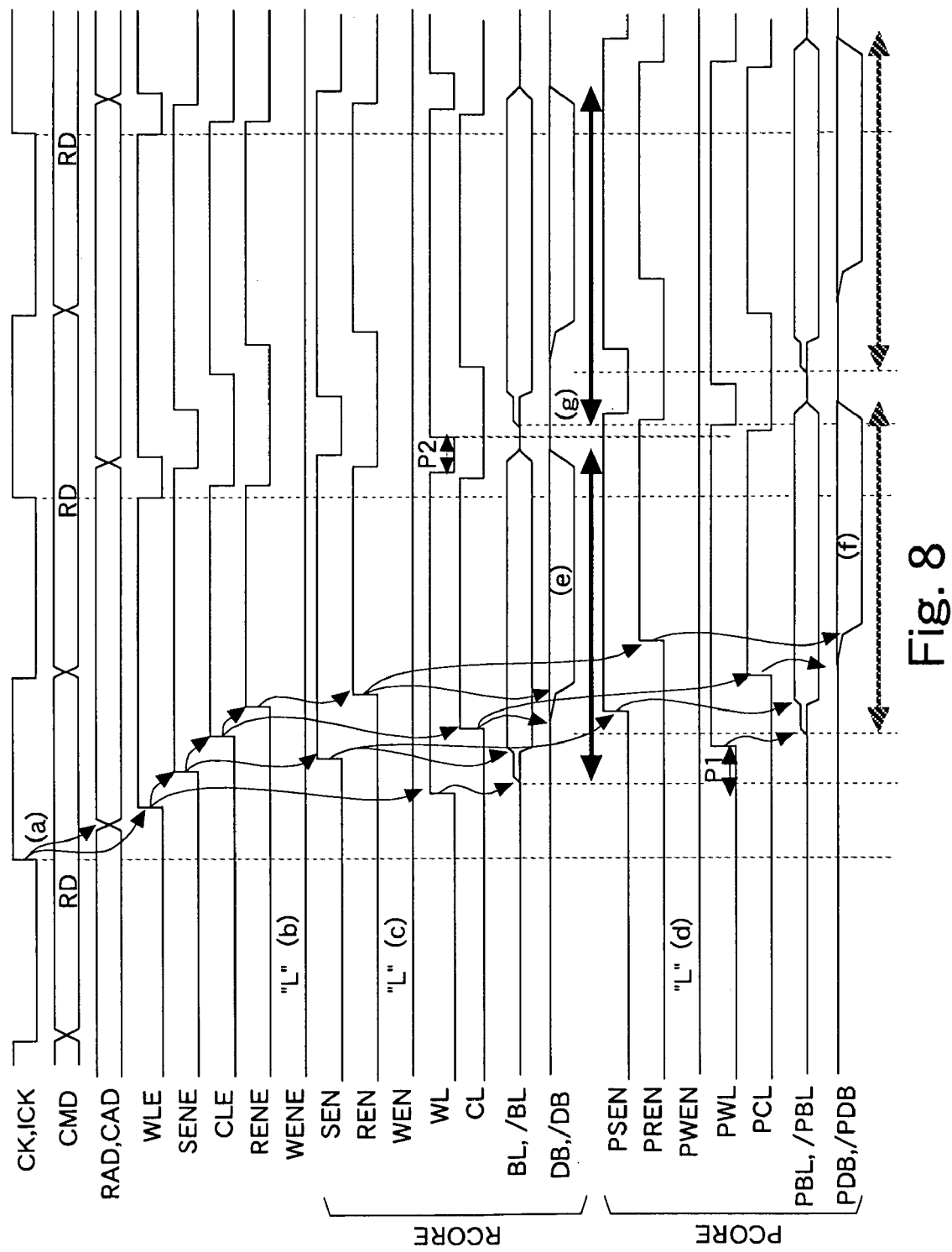
FIG. 8 illustrates an example of a read operation to the semiconductor memory in FIG. 1.

FIG. 8 illustrates an example of the read operation to the memory MEM illustrated in FIG. 1. In this example, the read commands RD are successively supplied. A detailed description of the same operations as those in FIG. 6 will be omitted. A cycle of the clock signal CK is the same as that in FIG. 6. Namely, a read cycle time is equivalent to a write cycle time in FIG. 6. A bold arrow in the drawing indicates a period during which the regular data is read from the regular memory cell MC to the regular bit lines BL, /BL, or a period during which the regular data is written into the regular memory cell MC from the regular bit lines BL, /BL. A bold dotted arrow in the drawing indicates a period during which the parity data is read from the parity memory cell MC to the parity bit lines PBL, /PBL, or a period during which the parity data is written into the parity memory cell MC from the parity bit lines PBL, /PBL. Specifically, the bold arrow indicates a read operation period (execution period of the read-modify-write).

A length of the read operation period of the regular memory core RCORE and that of the parity memory core PCORE are equivalent to each other, and are equivalent to the write operation period illustrated in FIG. 6. The read operation period of the parity memory core PCORE is delayed with respect to the read operation period of the regular memory core RCORE, and the read operation periods of the memory cores RCORE and PCORE are overlapped with each other. In the read operation, the data selection circuit DTSEL, the data latch DTLT and the write parity generation circuit WPGEN do not operate, and the data output control circuit DOCNT operates.

The memory MEM receives the read command RD and the not-illustrated address signal AD in synchronization with the rising edge of the clock signal CK (FIG. 8(a)). Thereafter, the operations from when the parity code PC is read to the parity data buses PDB, /PDB to when the error of the read data signal RDT is corrected by the error correction circuit ERRC (operations until FIG. 6(o)) are the same as those in FIG. 6. In the read operation, the operation control circuit 24 maintains the write enable signal WENE and the not-illustrated latch signal LT at a low level L (FIG. 8(b)). For this reason, the write enable signal WEN and the parity write enable signal PWEN are also maintained at a low level (FIG. 8(c and d)).

The data output control circuit DOCNT operates in a high level period of the read control signal RD1Z, and outputs the corrected read data signal CRDT as the data output signal ODAT. Since the data selection circuit DTSEL does not operate, the data signal on the data buses DB, /DB and the data signal on the parity data buses PDB, /PDB do not change (FIG. 8(e and f)). Subsequently, before the read operation to the parity memory core PCORE completes, the word line WL is activated in response to the second read command RD, and the second read operation to the regular memory core RCORE is started in the same manner as described above (FIG. 8(g)). The read operation in response to the first read command RD completes.

Also in the read operation, similar to the write operation, the regular memory core RCORE and the parity memory core PCORE have operation periods being overlapped with each other, and operate in mutually different timings. Further, before the read operation to the parity memory core PCORE completes, the read operation to the regular memory core RCORE responding to the following read command RD is started. Concretely, before the parity word line PWL is inactivated, the regular word line WL is activated in response to the following write command WR.

Also in the read operation cycle, the activation period of the regular word line signal WL and the activation period of the parity word line signal PWL are set to be equivalent to each other. A period P1 from the activation of the regular word line signal WL to the activation of the parity word line signal PWL is set longer than an inactivation period P2 of the regular word line signal WL when the read commands RD are successively supplied. Further, the sum of the period P1 and the activation period of the parity word line signal PWL is set longer than an interval of the activation timing of the regular word line signal WL being successively activated when the read commands RD are continuously supplied. In other words, the sum of the period P1 and the activation period of the parity word line signal PWL is set longer than the sum of the activation period and the inactivation period P2 of the regular word line signal WL.

Accordingly, it is possible to make a read cycle time (access cycle time) of the memory MEM be substantially equivalent to the actual operation time of the regular memory core RCORE and the parity memory core PCORE. In this example, the read cycle time is one clock cycle, which is the minimum supply interval of the read command RD. As a result of this, the data transfer rate of the memory MEM can be improved, which results in enhancing the performance of the system SYS in which the memory MEM is mounted.

Figure 9:
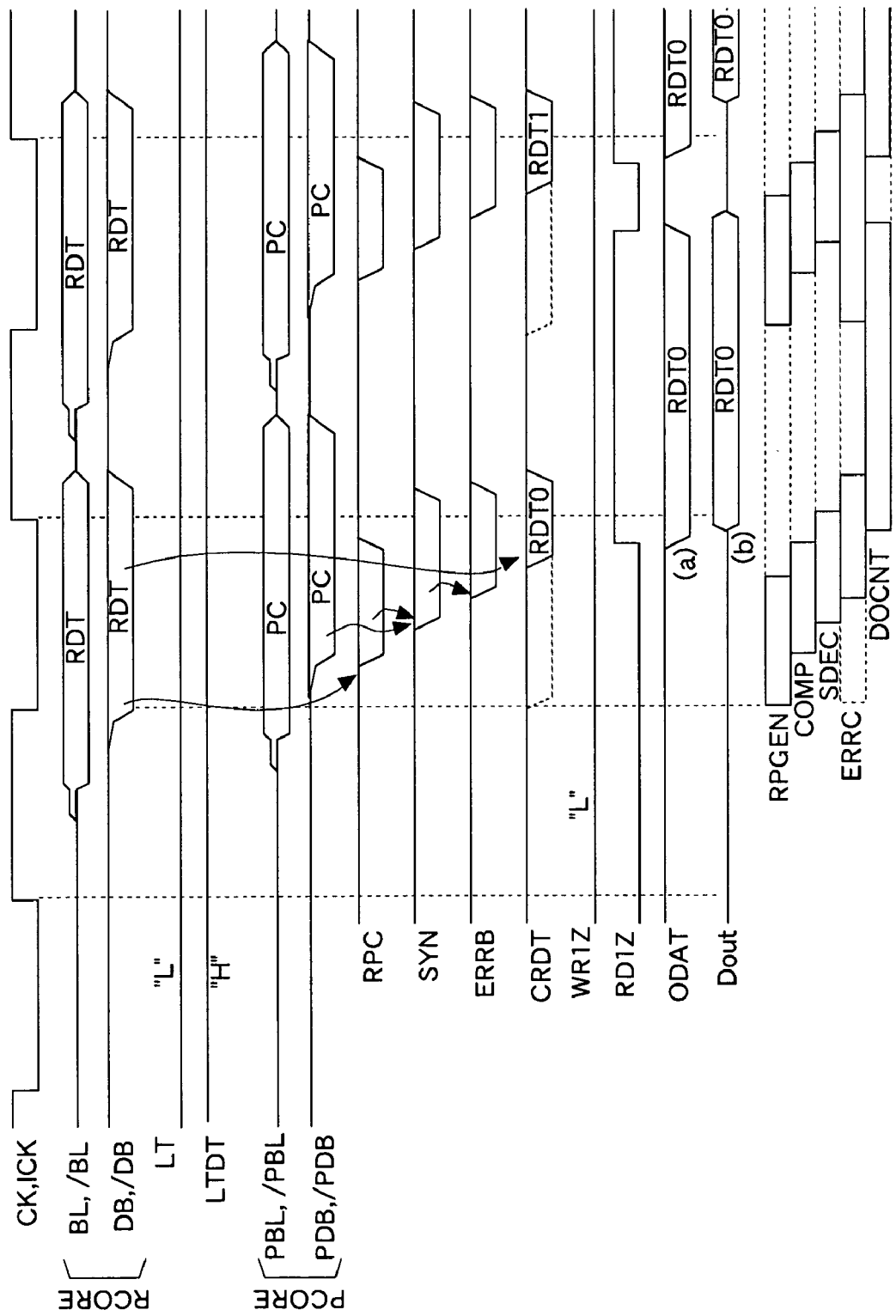
FIG. 9 illustrates an error correction operation in the read operation in FIG. 8.

FIG. 9 illustrates details of an error correction operation in the read operation illustrated in FIG. 8. A detailed description of the same operations as those in FIG. 7 will be omitted. In this example, in response to the three read commands RD illustrated in FIG. 8, the data output signals Dout (read data signals RDT0, RDT1, . . . ) are sequentially output from the memory MEM. Quadrangles being long from side to side illustrated at the bottom of the drawing indicate the operation periods of the respective circuits RPGEN, COMP, SDEC, ERRC, and DOCNT in the error correction unit ECCU. The operations of the parity generation circuit RPGEN, the comparison circuit COMP, the syndrome decoder SDEC and the error correction circuit ERRC are the same as those in FIG. 6. The data selection circuit DTSEL, the data latch DTLT and the write parity generation circuit WPGEN do not operate.

The data output control circuit DOCNT operates in a high level period of the read control signal RD1Z, and outputs a read data signal RDT0 corrected by the error correction circuit ERRC to a data output signal line ODAT (FIG. 9(a)). The data output buffer 20 outputs the read data signal RDT0 transmitted to the data output signal line ODAT to the data output terminal Dout (FIG. 9(b)).

Figure 10:
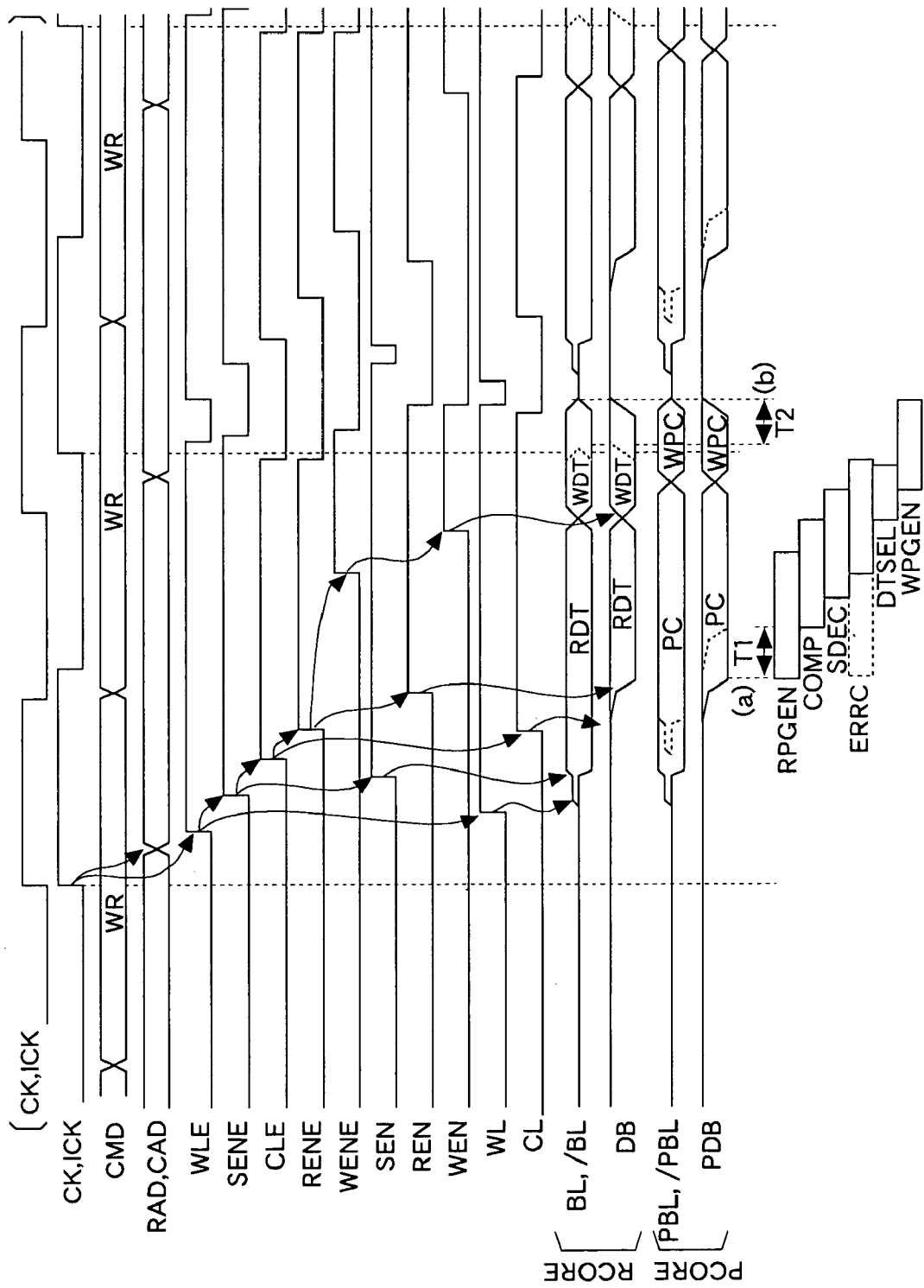
FIG. 10 illustrates a write operation to a semiconductor memory before the semiconductor memory in FIG. 1 is proposed.

FIG. 10 illustrates a write operation of the semiconductor memory examined by the inventor. The operation illustrated in FIG. 10 is not publicly known. The clock signals CK and ICK illustrated by being bracketed in the drawing indicate the clock cycles in FIG. 6 and FIG. 7. In FIG. 10, the regular memory core RCORE and the parity memory core PCORE sequentially receive the common word enable signal WLE, sense amplifier enable signal SENE, column enable signal CLE, read enable signal RENE and write enable signal WENE, and both operate in the same timing.

The parity code PC is read to the parity data buses PDB, /PDB by being precedent to the start of the operation of the comparison circuit COMP by a time T1 (FIG. 10(a)). Namely, the parity memory core PCORE starts its operation earlier by the time T1 than the timing in FIG. 6 illustrated by the dotted line in the drawing. The write data signal WDT is maintained on the data buses DB, /DB as much as a time T2 after being written into the regular memory cell MC (FIG.

10(*b*)). Specifically, the regular memory core RCORE completes its operation by being delayed by the time T2 from the timing in FIG. 6 illustrated by the dotted line in the drawing.

In the example illustrated in FIG. 10, the regular memory core RCORE and the parity memory core PCORE operate at the same time, so that the write cycle time (one clock cycle, in this example) becomes longer than that in FIG. 6. Generally, in order to simplify the control of the system accessing the semiconductor memory, the read cycle time is set to the same value as that of the write cycle time. Accordingly, the read cycle time also becomes longer than that in FIG. 8 and FIG. 9. As a result of this, the data transfer rate of the semiconductor memory is lowered, resulting that the performance of the system in which the semiconductor memory is mounted is lowered.

As just described, in this embodiment, it is possible to make the write cycle time of the memory MEM be substantially equivalent to the actual operation time of the regular memory core RCORE and the parity memory core PCORE. Since it is possible to start the access to the regular memory cell responding to the following write command during when the parity memory cell is accessed, the access cycle time of the semiconductor memory MEM can be reduced. Therefore, the data transfer rate of the memory MEM can be enhanced, which enables to improve the performance of the system SYS in which the memory MEM is mounted.

Especially, the access cycle time of the semiconductor memory which requires the read-modify-write for the error correction can be reduced. Concretely, it is possible to reduce the access cycle time in the semiconductor memory having a function to selectively mask the write of the write data signal supplied to the data input terminal into the regular memory cell MC.

The respective circuits RPGEN, WPGEN, COMP, SDEC, and ERRC in the error correction unit ECCU operate in synchronization with a change of either bit level of the complementary signal lines from the valid level to the invalid level. For this reason, operations of main circuits of the error correction unit ECCU can be automatically started and terminated without using external control signals. Therefore, it is possible to minimize a loss of the operation timing of the error correction unit ECCU. Since the time of the error correction operation can be reduced, the access cycle time can be reduced.

Figure 11:
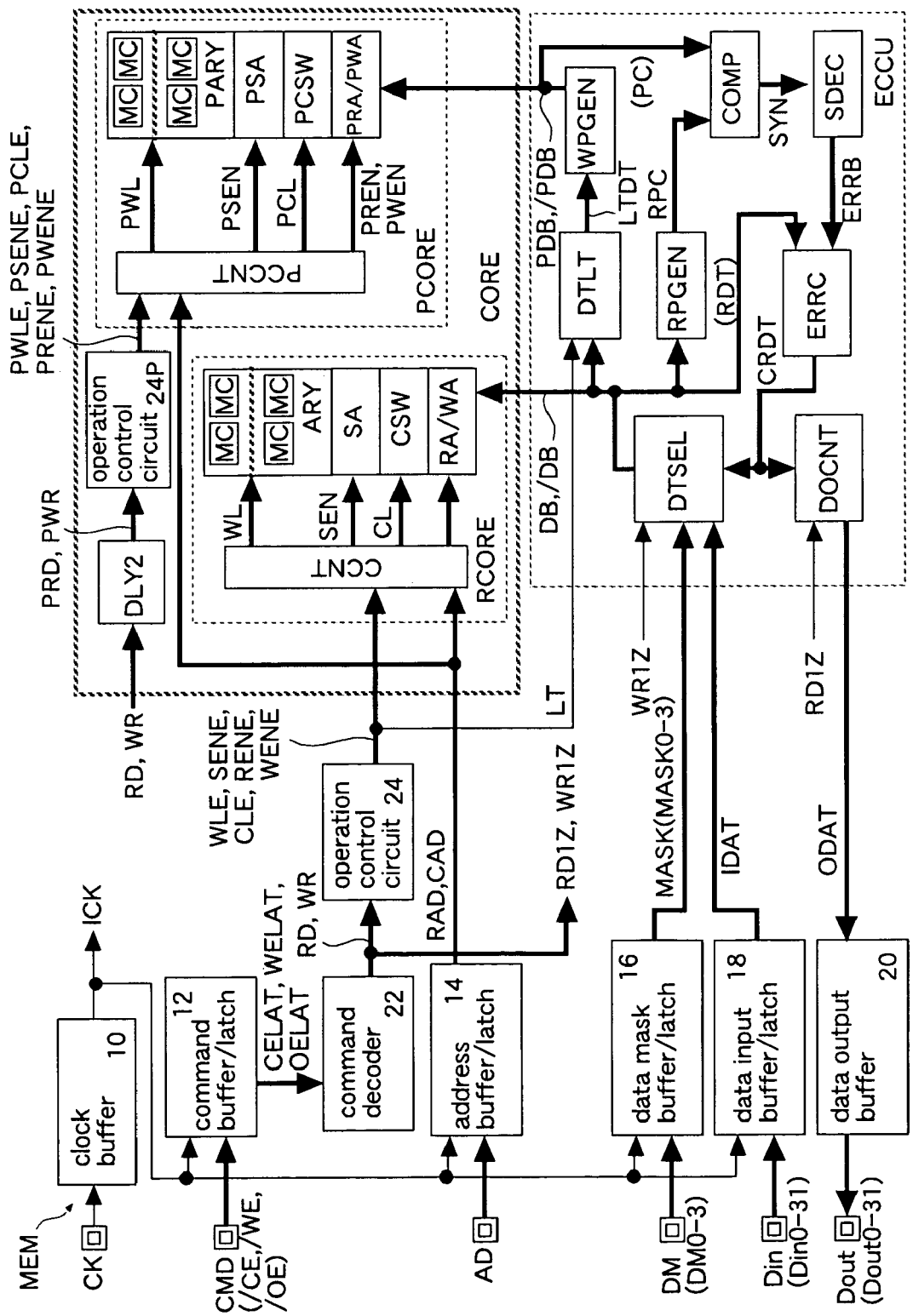
FIG. 11 illustrates another embodiment.

FIG. 11 illustrates another embodiment. The same numerals and symbols will be used to designate the same elements as those described in the aforementioned embodiment, and the detailed description thereof will be omitted. In this embodiment, the parity memory core PCORE is different from that in FIG. 1 and FIG. 4. Further, the semiconductor memory MEM has a delay circuit DLY2 and an operation control circuit 24P. The other configurations are the same as those of the aforementioned embodiment. The semiconductor memory MEM is mounted in the system SYS as illustrated in FIG. 5, for instance.

The operation control circuit 24 is exclusively provided to operate the regular memory core RCORE. The operation control circuit 24P is exclusively provided to operate the parity memory core PCORE. The delay circuit DLY2 delays the read command signal RD and the write command signal WR, respectively, and outputs them as a parity read command signal PRD and a parity write command signal PWR. A delay time of the delay circuit DLY2 is equivalent to the delay time of the delay circuit DLY1 in FIG. 4.

The operation control circuit 24P has the same circuit configuration as that of the operation control circuit 24. The operation control circuit 24P outputs a parity word enable signal PWLE, a parity sense amplifier enable signal PSENE, a parity column enable signal PCLE, the parity read enable signal PRENE, the parity write enable signal PWENE and a not-illustrated parity precharge enable signal to execute the read operation and the write operation to the parity memory core PCORE in response to the parity read command signal PRD and the parity write command signal PWR. When performing the refresh operation, the operation control circuit 24P outputs only the parity word enable signal PWLE, the parity sense amplifier enable signal PSENE, and the parity precharge enable signal. Roles of the signals PWLE, PSENE, PCLE, PRENE, and PWENE output from the operation control circuit 24P are the same as the roles of the signals WLE, SENE, CLE, RENE, and WENE output from the operation control circuit 24.

In the parity memory core PCORE, a parity core control circuit PCCNT is disposed in place of the delay circuit DLY1 in FIG. 1. The parity memory block PBLK, the parity sense amplifier PSA, the parity column switch PCSW, the parity read amplifier PRA, and the parity write amplifier PWA are the same as those in FIG. 1.

The parity core control circuit PCCNT receives the parity access control signals PWLE, SENE, CLE, and not-illustrated parity precharge enable signal generated in response to the parity read command signal PRD and the parity write command signal PWR and the address signals RAD and CAD, and outputs the parity word line signal PWL corresponding to the address signals RAD and CAD, the parity sense amplifier activation signal PSEN, the parity column control signal PCL, and the parity precharge control signal. In addition, the parity core control circuit PCCNT outputs the parity read amplifier activation signal PREN in response to the control signal PRENE generated in response to the parity read command signal PRD, and outputs the parity write amplifier activation signal PWEN in response to the control signal PWENE generated in response to the parity write command signal PWR. Namely, the parity core control circuit PCCNT operates as a parity signal generation circuit generating the parity access control signal.

Figure 12:
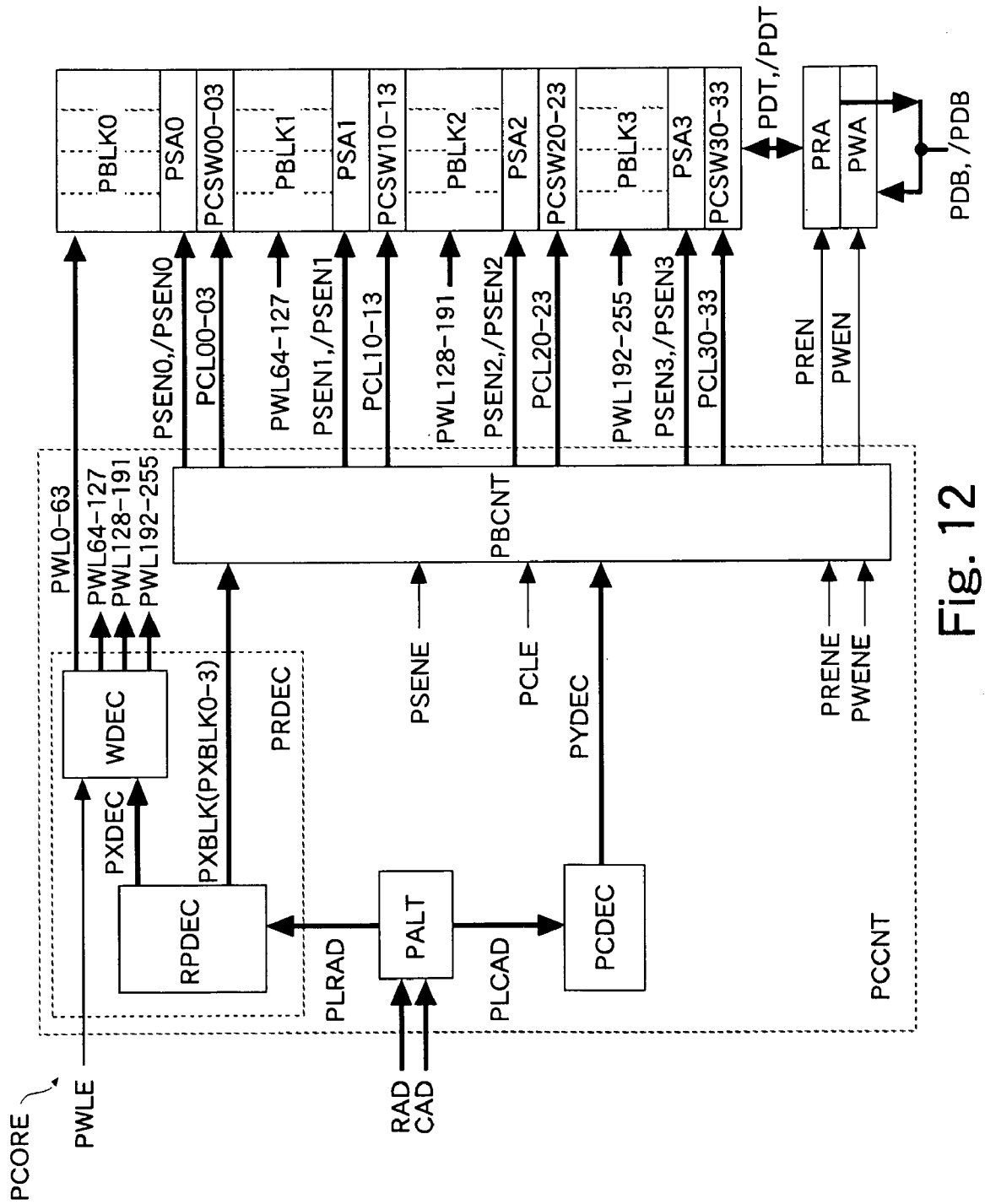
FIG. 12 illustrates details of a parity memory core in FIG. 11.

FIG. 12 illustrates details of the parity memory core PCORE in FIG. 11. The parity core control circuit PCCNT has a parity address latch circuit PALT, a parity row decoder PRDEC, a parity column decoder PCDEC, and a parity block control circuit PBCNT. The parity address latch circuit PALT latches the row address signal RAD, and outputs it as a latched row address signal PLRAD to the row decoder RDEC. Further, the parity address latch circuit PALT latches the column address signal CAD, and outputs it as a latched column address signal PLCAD to the parity column decoder PCDEC.

The parity row decoder PRDEC is the same circuit as the row decoder RDEC in FIG. 2. The parity row decoder PRDEC operates by receiving the parity word enable signal PWLE and the latched row address signal PLRAD, and outputs the parity word line signals PWL0-255 and the block decode signals PXBLK (PXBLK0-3). The parity column decoder PCDEC decodes the latched column address signal PLCAD, and outputs it as a column decode signal PYDEC.

The parity block control circuit PBCNT is the same circuit as the block control circuit BCNT in FIG. 2. The parity block control circuit PBCNT operates by receiving the parity sense amplifier enable signal PSENE, the parity column enable signal PCLE, the parity read enable signal PRENE, the parity write enable signal PWENE, the block decode signals PXBLK (PXBLK0-3) and the column decode signal PYDEC, and outputs the parity sense amplifier activation signals PSEN0-3, /PSEN0-3, the parity column control signals PCL00-03, PCL10-13, PCL20-23, and PCL30-33, the parity read amplifier activation signal PREN, and the parity write amplifier activation signal PWEN.

Figure 13:
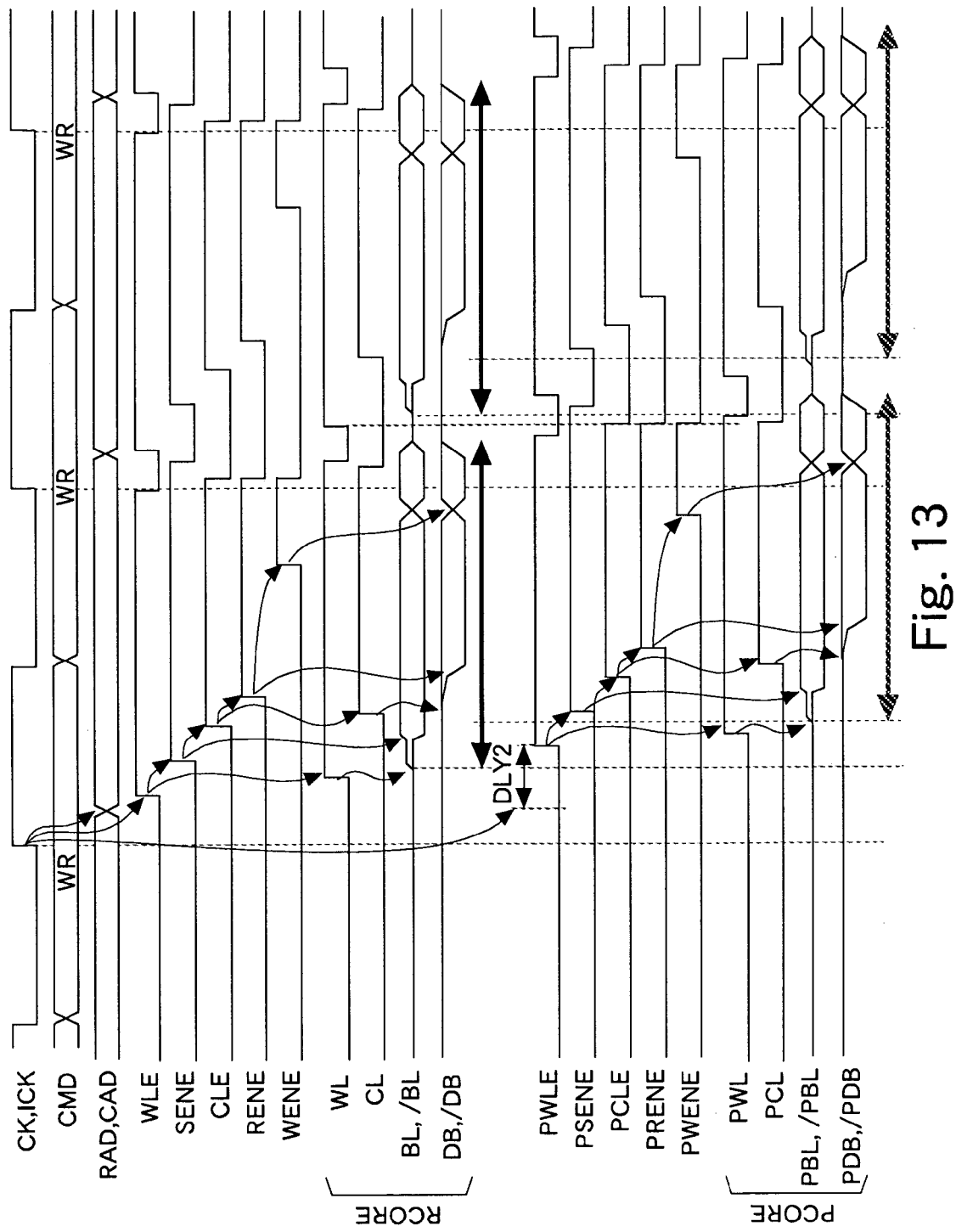
FIG. 13 illustrates an example of a write operation to a semiconductor memory illustrated in FIG. 11.

FIG. 13 illustrates an example of the write operation to the semiconductor memory MEM illustrated in FIG. 11. A detailed explanation of the same operations as those in FIG. 6 will be omitted. A cycle of the clock signal CK is the same as that in FIG. 6. A bold arrow in the drawing indicates the write operation period of the regular memory core RCORE and that of the parity memory core PCORE, similarly as in FIG. 6. A length of the write operation period of the regular memory core RCORE and that of the parity memory core PCORE are equivalent to each other. The write operation period of the parity memory core PCORE is delayed with respect to the write operation period of the regular memory core RCORE, and the write operation periods of the memory cores RCORE and PCORE are overlapped with each other.

In this embodiment, the regular memory core RCORE operates by the control of the operation control circuit 24. The parity memory core PCORE operates by the control of the operation control circuit 24P which operates by being delayed from the operation control circuit 24 by the delay time of the delay circuit DLY2. The parity word enable signal PWLE, the parity sense amplifier enable signal PSENE, the parity column enable signal PCLE, the parity read enable signal PRENE, the parity write enable signal PWENE are output by being delayed from the word enable signal WLE, the sense amplifier enable signal SENE, the column enable signal CLE, the read enable signal RENE, and the write enable signal WENE by the delay time of the delay circuit DLY2, respectively.

The operation timings of the regular memory core RCORE and the parity memory core PCORE are the same as those in FIG. 6. A waveform of the read operation is the same as that in FIG. 13 except that the parity write enable signal PWENE is not activated, and the corrected read data signal CRDT generated by the error correction unit ECCU and the new parity code PC are not written into the memory core CORE. The read cycle time is equivalent to the write cycle time. As just described, also in this embodiment, the same effect as in the aforementioned embodiment can be obtained.

Figure 14:
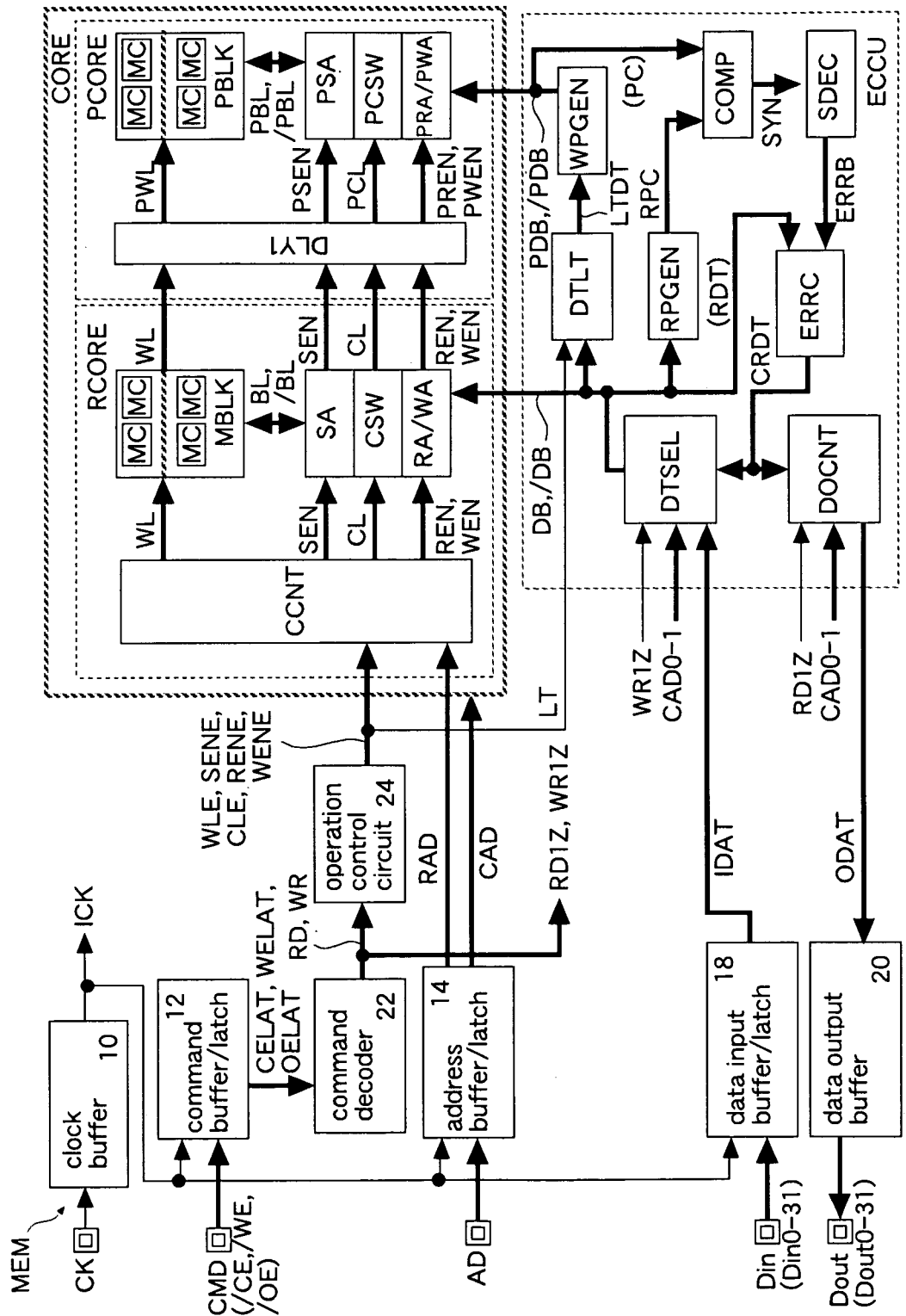
FIG. 14 illustrates still another embodiment.

FIG. 14 illustrates still another embodiment. The same numerals and symbols will be used to designate the same elements as those described in the aforementioned embodiments, and the detailed description thereof will be omitted. The semiconductor memory MEM is mounted in the system SYS as illustrated in FIG. 5, for example. The semiconductor memory MEM of this embodiment is configured by deleting the data mask terminal DM and the data mask buffer/latch 16 from the semiconductor memory MEM in FIG. 1. The regular data buses DB, /DB has 256 signal lines (quadruple of the signal lines in FIG. 1), and the parity data buses PDB, /PDB has 16 signal lines. Specifically, in the read operation responding to one read command RD, 128-bit regular data is read from the regular memory core RCORE, and 8-bit parity code PC is read from the parity memory core PCORE. In the write operation responding to one write command WR, 128-bit regular data is written into the regular memory core RCORE, and 8-bit parity code PC is written into the parity memory core PCORE. Since the number of bits of the data signal supplied to the error correction unit ECCU increases compared to that in FIG. 1, the number of bits of the parity code RPC relatively decreases. The configurations except the memory cores RCORE and PCORE and the error correction unit ECCU are the same as those of the aforementioned embodiments.

For instance, complementary data signal lines LTDC, ERRB, and CRDT in the error correction unit ECCU have 256 signal lines, respectively. A complementary parity data line RPC has 16 signal lines. The functions of the error correction unit ECCU are the same as those of the aforementioned embodiments except that the number of bits of the data signal to be handled is different, the data selection circuit DTSEL is different, and the data output control circuit DOCNT is different.

The data selection circuit DTSEL operates in a high level period of the write control signal WR1Z, and replaces, in accordance with the column address signals CAD0-1, 32-bit corrected read data signals (64-bit complementary corrected read data signals CRDT) among 128-bit corrected read data signals CRDT0-127 (256-bit complementary corrected read data signals CRDT) with 32-bit data input signals IDAT (64-bit complementary data input signals IDAT) supplied from the data input buffer/latch 18. For instance, when the column address signals CAD0-1 indicate "00", the corrected read data signals CRDT0-31 are replaced with the data input signals IDAT, and when the column address signals CAD0-1 indicate "10", the corrected read data signals CRDT64-95 are replaced with the data input signals IDAT. The data selection circuit DTSEL outputs the complementary corrected read data signals CRDT whose data are partially replaced to the data buses DB, /DB. In this embodiment, in the write operation, the number of bits of the regular data (128 bits) to generate the parity code PC is larger than the number of bits of the write data (32 bits). Accordingly, the read-modify-write is required.

The data output control circuit DOCNT operates in a high level period of the read control signal RD1Z, selects, in accordance with the column address signals CAD0-1, the 32-bit corrected read data signals among the 128-bit corrected read data signals CRDT, and outputs the selected data signals as 32-bit data output signals ODAT (64-bit complementary data output signals ODAT).

Figure 15:
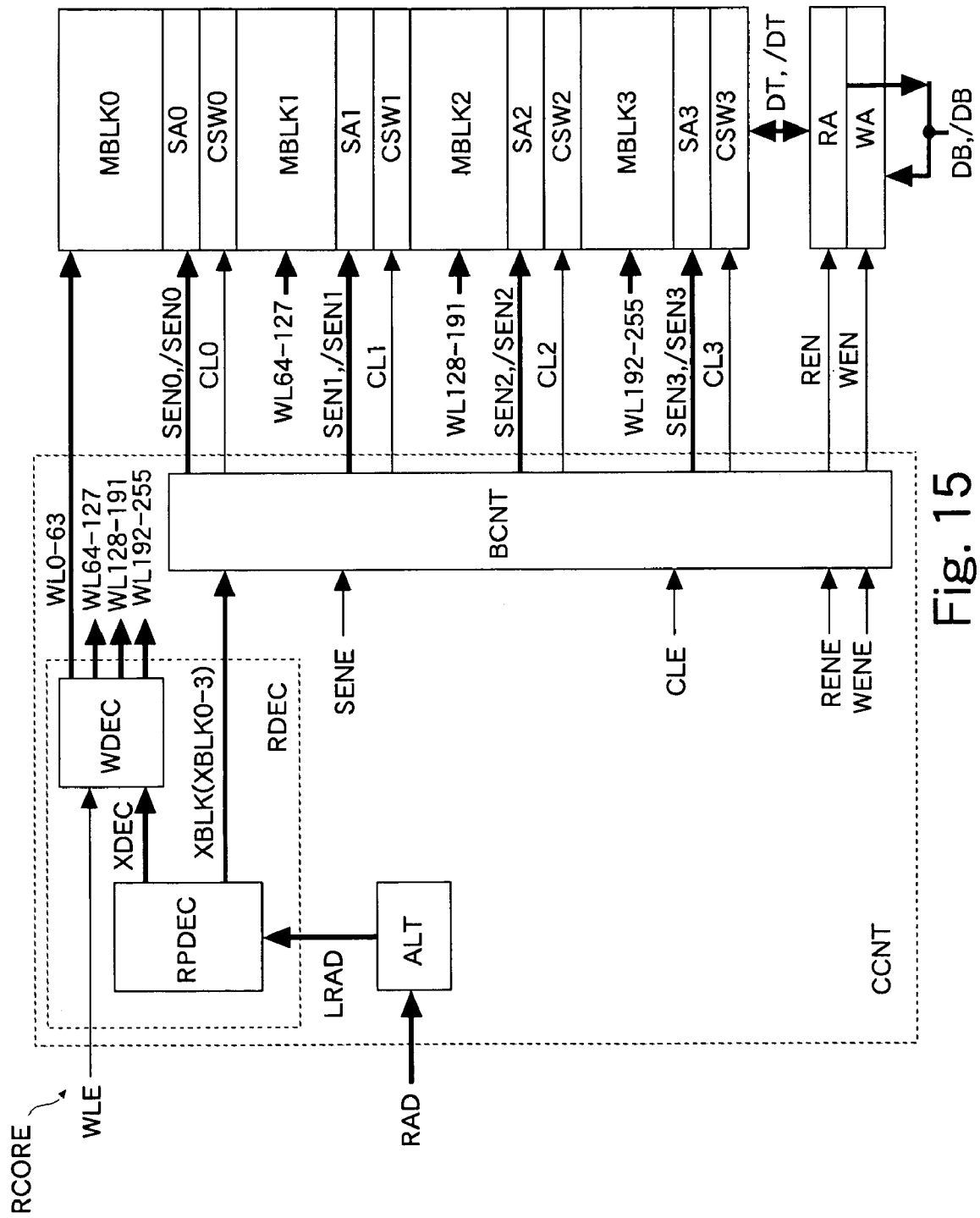
FIG. 15 illustrates a regular memory core in FIG. 14.

FIG. 15 illustrates details of the regular memory core RCORE in FIG. 14. A detailed description of the same configuration as that of FIG. 2 will be omitted. The regular memory core RCORE is configured by deleting the address latch circuit ALT and the column decoder CDEC for the column address signal CAD from the regular memory core RCORE in FIG. 2. The block control circuit BCNT selects either of the column control signals CL (CL0-3) in accordance with the block decode signals XBLK (XBLK0-3), and activates the selected column control signal CL in response to the column enable signal CLE. The other functions of the block control circuit BCNT are the same as those of the block control circuit BCNT in FIG. 2. The row decoder RDEC is the same as the row decoder RDEC in FIG. 2.

The regular memory blocks MBLK0-3 are the same as the memory blocks MBLK0-3 in FIG. 2 except that 256 complementary column switches CSW are turned on at the same time in response to the column control signal CL. The sense amplifiers SA0-3 and the memory blocks MBLK0-3 are coupled to 128 sets of complementary data lines DT, /DT via the column switches CSW. For instance, there are 128 read amplifiers RA and 128 write amplifiers WA. The read amplifiers RA operate at the same time in synchronization with the read amplifier activation signal REN. The write amplifiers WA operate at the same time in synchronization with the write amplifier activation signal WEN. Configurations and operations of the sense amplifiers SA0-3 are the same as those of the aforementioned embodiments.

Figure 16:
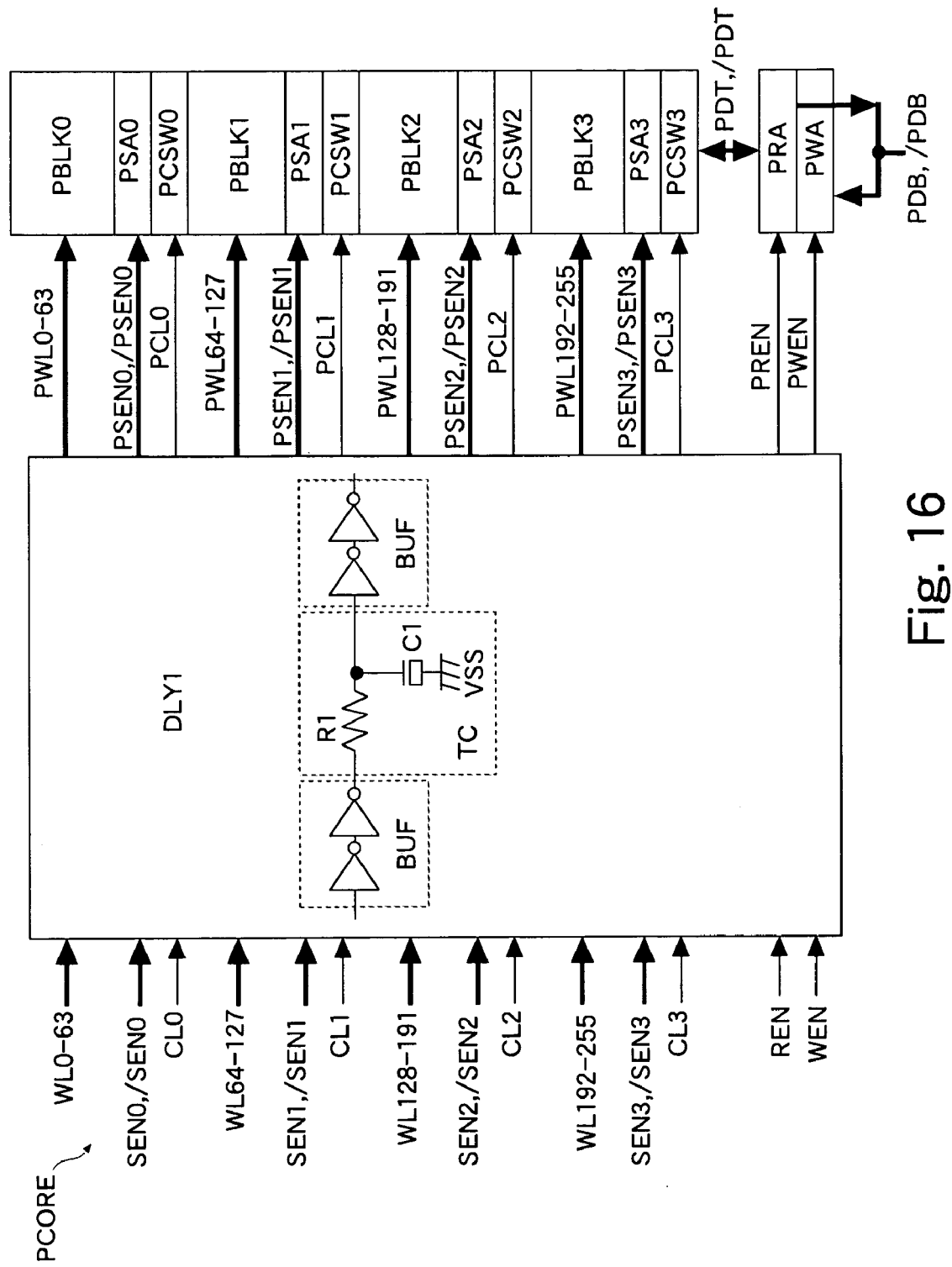
FIG. 16 illustrates a parity memory core in FIG. 14.

FIG. 16 illustrates details of the parity memory core PCORE in FIG. 14. A detailed description of the same configuration as that of FIG. 4 will be omitted. In this embodiment, the number of column control signals CL0-4 is smaller than that in FIG. 4. Accordingly, the number of the time constant circuit TC and the buffer circuits BUF formed in the delay circuit DLY1 is smaller than that in FIG. 4.

In the parity memory blocks PBLK0-3, eight parity memory cells MC are coupled to one parity word line WL. The 16 complementary parity column switches PCSW are simultaneously turned on in response to the parity column control signal PCL (either of PCL0-3). The parity sense amplifiers PSA0-3 and the parity memory blocks PBLK0-3 are coupled to eight sets of the complementary parity data lines PDT, /PDT via the parity column switches PCSW. For example, eight parity sense amplifiers PSA exist in each region. There are eight parity read amplifiers PRA and eight parity write amplifiers PWA. The parity read amplifiers PRA operate at the same time in synchronization with the parity read amplifier activation signal PREN. The parity write amplifiers PWA operate at the same time in synchronization with the parity write amplifier activation signal PWEN.

Further in this embodiment, the same effect as in the aforementioned embodiments can be obtained. Especially, in this embodiment, it is possible to reduce the access cycle time in the semiconductor memory MEM whose number of bits of the regular data (128 bits) to generate the parity code PC is larger than the number of bits of the write data (32 bits) supplied via the data input terminal Din.

Figure 17:
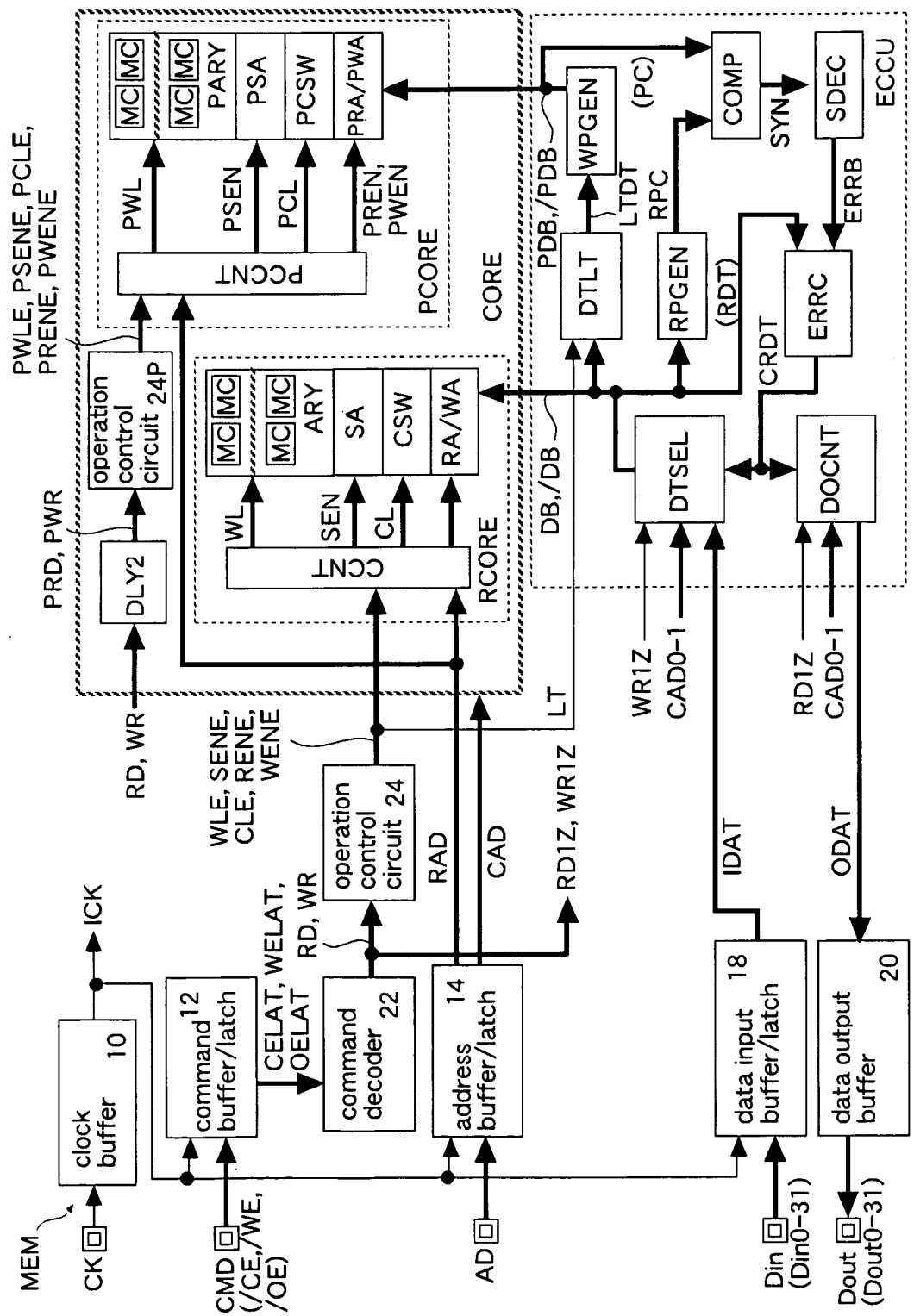
FIG. 17 illustrates yet another embodiment.

FIG. 17 illustrates yet another embodiment. The same numerals and symbols will be used to designate the same elements as those described in the aforementioned embodiments, and the detailed description thereof will be omitted. The semiconductor memory MEM is mounted in the system SYS as illustrated in FIG. 5, for instance. The semiconductor memory MEM of this embodiment is configured by deleting the data mask terminal DM and the data mask buffer/latch 16 from the semiconductor memory MEM in FIG. 11. The regular data buses DB, /DB has 256 signal lines, and the parity data buses PDB, /PDB has 16 signal lines. Specifically, in the read operation responding to one read command RD, 128-bit regular data is read from the regular memory core RCORE, and 8-bit parity code PC is read from the parity memory core PCORE. In the write operation responding to one write command WR, 128-bit regular data is written into the regular memory core RCORE, and 8-bit parity code PC is written into the parity memory core PCORE. The error correction unit ECCU is the same as the error correction unit ECCU in FIG. 14. The configurations except the memory cores RCORE and PCORE and the error correction unit ECCU are the same as those of the aforementioned embodiments.

Figure 18:
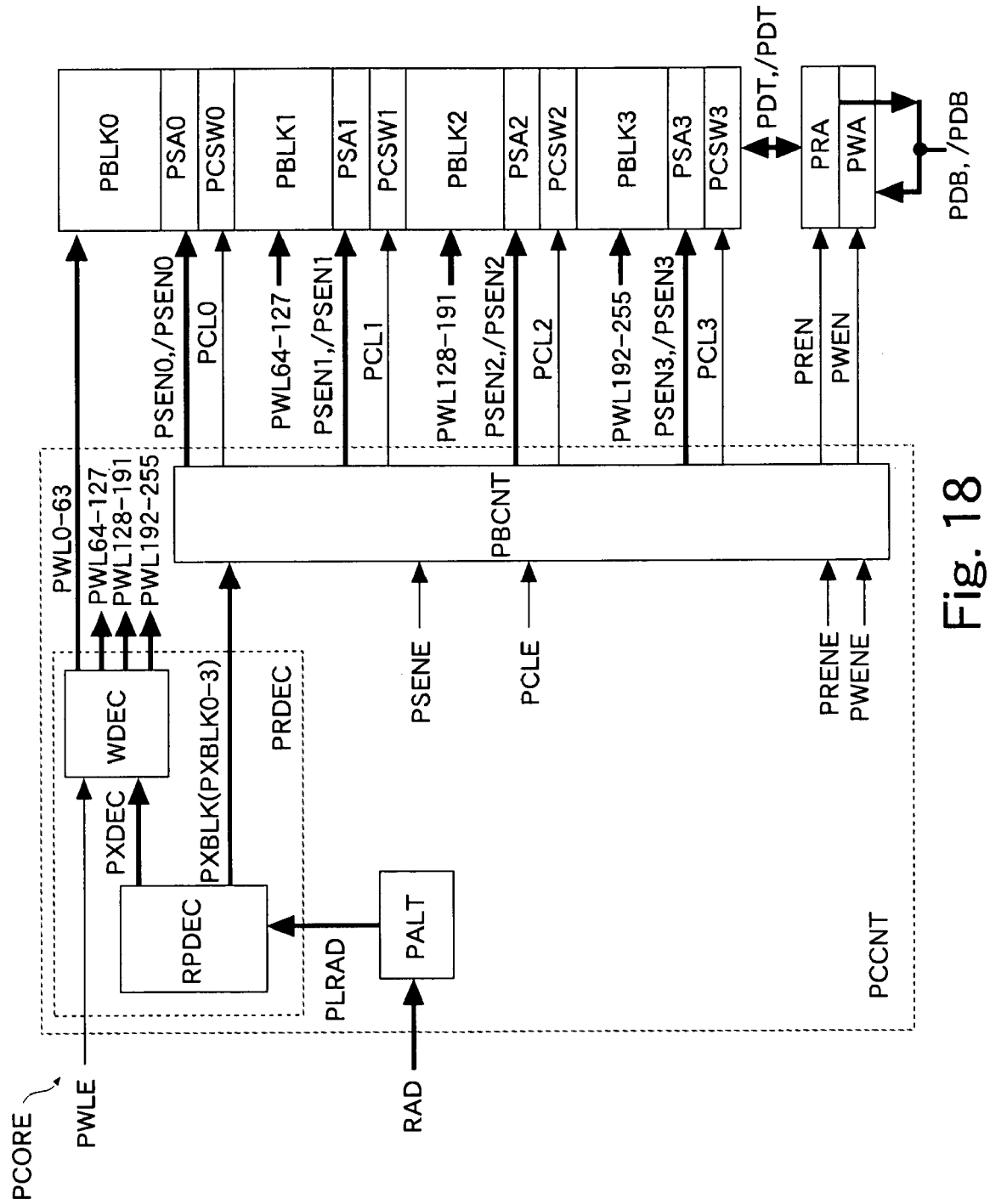
FIG. 18 illustrates a parity memory core in FIG. 17.

FIG. 18 illustrates details of the parity memory core PCORE in FIG. 17. A detailed description of the same configuration as that of FIG. 12 will be omitted. The parity memory core PCORE is configured by deleting the address latch circuit ALT and the column decoder CDEC for the column address signal CAD from the parity memory core PCORE in FIG. 12. The parity block control circuit PBCNT selects either of the parity column control signals PCL (PCL0-3) in accordance with the block decode signal PXBLK, and activates the selected parity column control signal PCL in response to the parity column enable signal PCLE. The other functions of the parity block control circuit PBCNT are the same as those of the parity block control circuit PBCNT in FIG. 12. The row decoder PRDEC is the same as the row decoder RDEC in FIG. 12. The parity memory blocks PBLK0-3 are the same as the parity memory blocks PBLK0-3 in FIG. 16.

Further in this embodiment, the same effect as in the aforementioned embodiments can be obtained. Specifically, in this embodiment, it is possible to reduce the access cycle time in the semiconductor memory MEM whose number of bits of the regular data (128 bits) to generate the parity code PC is larger than the number of bits of the write data (32 bits) supplied via the data input terminal Din.

Note that examples where the aforementioned embodiments are applied to the FCRAM of the pseudo SRAM type were described. However, for example, the aforementioned embodiments may be applied to the FCRAM of an SDRAM type, the SDRAM, an SSRAM, or a semiconductor memory such as a ferroelectric memory. The above-described embodiments may be applied to a semiconductor memory of clock asynchronous type.

In the aforementioned embodiments, examples where the delay circuit DLY1 is configured by the time constant circuit TC and the two buffer circuits BUF were described. However, the delay circuit DLY1 may be configured by a delay element utilizing a wiring resistance. For instance, the delay element has a diffused resistor using a diffusion layer region formed on a semiconductor substrate of the memory MEM. The diffusion layer region is a region on which a source region and a drain region of the transistor are formed. The diffused resistor can be formed together with the source region and the drain region, so that there is no need to increase manufacture processes.

In the aforementioned embodiments, examples where the length of the write operation period of the regular memory core RCORE and that of the parity memory core PCORE are set to be equivalent to each other were described. However, the length of the write operation period of the regular memory core RCORE and that of the parity memory core PCORE may be mutually different. For example, it is possible to make the write operation time of the parity memory core PCORE having the smaller number of parity memory cells MC and shorter length of the parity word line PWL be shorter than the write operation time of the regular memory core RCORE. Accordingly, the read-modify-write period can be further reduced, resulting that the access cycle time of the semiconductor memory MEM can be further reduced.

In the aforementioned embodiments, examples where the write commands WR or the read commands RD are successively supplied to the semiconductor memory MEM were described. However, since the write cycle time and the read cycle time are equivalent to each other, even when the write commands WR and the read commands RD are randomly supplied to the semiconductor memory MEM, the same effect as described above can be obtained. Concretely, the read command RD may be supplied in the second clock cycle in FIG. 6 and FIG. 13. The write command WR may be supplied in the second clock cycle in FIG. 8.

The present embodiments can solve the following problems. Generally, the number of bits of the parity code becomes relatively small as the number of bits of the regular data to generate the parity code becomes large, and an effect on a chip size becomes small. For instance, by making the number of bits of the regular data to generate the parity code larger than the number of bits of the regular data input or output at a time to or from the data terminal, the number of bits of the parity code becomes relatively small.

In the write operation, the parity code is generated using not only the write data but also data held in the regular memory cell in which data is not written. Concretely, in the write operation, the regular data and the parity code are read at first, and an error of the regular data is corrected. Next, a part of the corrected regular data is replaced with the write data, thereby generating new regular data. A new parity code is generated using the new regular data, and the new regular data and the new parity code are written into the regular memory cell and the parity memory cell. This kind of operation is called read-modify-write, for instance.

There is a problem in the error correction which requires the read-modify-write that the access cycle time becomes longer compared to the general write operation.

A proposition of the embodiments is to reduce the access cycle time of the semiconductor memory which executes the read-modify-write when correcting errors.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A semiconductor memory, comprising:
    a plurality of regular memory cells to hold regular data written therein;
    a regular data control circuit to input or output the regular data to or from the regular memory cells;
    a parity memory cell to hold parity data of the regular data;
    a parity data control circuit to input or output the parity data to or from the parity memory cell;
    an error correction unit, coupled to the regular data control circuit and the parity data control circuit, to detect and correct an error of the regular data read from the regular memory cells using the regular data read from the regular memory cells and the parity data read from the parity memory cell in a write operation, to generate replaced regular data by replacing a part of corrected regular data with write data, to generate a parity write data using the replaced regular data, and to write the parity write data into the parity memory cell; and
    an access control circuit to generate regular access control signals to control the regular memory cells and the regular data control circuit to read the regular data from the regular memory cells and write the regular data into the regular memory cells when write commands are supplied, to generate parity access control signals to control the parity memory cell and the parity data control circuit to start a read of the parity data from the parity memory cell after the regular data starts to be read from the regular memory cells and during the read of the regular data, and to generate the regular access control signals to read the regular data from the regular memory cells in response to a following write command during the parity write data to be written into the parity memory cell is supplied to the parity memory cell.

2. The semiconductor memory according to claim 1, wherein the access control circuit, comprises:
    a regular access control circuit to activate the regular access control signals for a first period in response to each of the write commands, and to activate, when the write commands are supplied, a first regular access control signal among the regular access control signals corresponding to a first parity access control signal in response to the following write command during an activation of the first parity access control signal among the parity access control signals; and
    a parity access control circuit to activate the parity access control signals for a second period in response to each of the write commands, and to activate the first parity access control signal after the first regular access control signal starts to be activated and during the activation of the first regular access control signal.

3. The semiconductor memory according to claim 2, wherein
    a sum of a period from the activation of the first regular access control signal to the activation of the first parity access control signal and an activation period of the first parity access control signal is set longer than an interval of an activation timing of the first regular access control signal being activated when the write commands are continuously supplied.

4. The semiconductor memory according to claim 2, wherein:
    the activation period of the first regular access control signal and the activation period of the first parity access control signal are set to be equivalent to each other; and
    a period from the activation of the first regular access control signal to the activation of the first parity access control signal is set longer than an inactivation period of the first regular access control signal when the write commands are supplied.

5. The semiconductor memory according to claim 2, further comprising:
    a regular word line coupled to the regular memory cells; and
    a parity word line coupled to the parity memory cell, wherein:
    the first regular access control signal is a regular word line signal activating the regular word line; and
    the first parity access control signal is a parity word line signal activating the parity word line.

6. The semiconductor memory according to claim 2, wherein:
    the regular access control circuit comprises a regular signal generation circuit to generate the regular access control signals in response to the write commands; and
    the parity access control circuit comprises a delay element to receive the regular access control signals and to generate the parity access control signals by delaying the received regular access control signals.

7. The semiconductor memory according to claim 2, wherein:
    the regular access control circuit comprises a regular signal generation circuit generating the regular access control signals in response to the write commands; and
    the parity access control circuit comprises a delay element to receive the write commands and to generate a parity write command by delaying the received write commands and a parity signal generation circuit to generate the parity access control signals in response to the parity write command.

8. The semiconductor memory according to claim 1, further comprising:
    a data input buffer to receive a plurality of data groups as the write data; and
    a data mask buffer to receive a mask signal indicating the data group being disabled to be written into the regular memory cells, wherein
    the error correction unit comprises a data selection circuit to replace at least a part of the corrected regular data with write data of the data group from which the data group being disabled by the mask signal to be written is excluded.

9. The semiconductor memory according to claim 1, further comprising:
- a complementary regular data bus to transmit the regular data between the regular data control circuit and the error correction unit; and
- a complementary parity data bus to transmit the parity data between the parity data control circuit and the error correction unit, wherein
- the error correction unit, comprises:
- a read parity generation circuit to generate, when either bit of the regular data on the complementary regular data bus is changed from an invalid level to a valid level, complementary read parity data from the regular data in synchronization with a change of the either bit of the regular data;
- a comparison circuit to detect, when either bit of the parity data on the complementary parity data bus is changed from the invalid level to the valid level, an error of the regular data from the complementary read parity data and the parity data in synchronization with a change of the either bit of the parity data;
- an error correction circuit to correct the error of the regular data based on a detection result of the error from the comparison circuit;
- a data selection circuit to rewrite a part of the corrected regular data to write data; and
- a write parity generation circuit to generate the parity write data from the regular data selected by the data selection circuit.

10. An operating method of a semiconductor memory having a plurality of regular memory cells holding regular data written therein, a regular data control circuit to input or output the regular data to or from the regular memory cells, a parity memory cell holding parity data of the regular data, a parity data control circuit to input or output the parity data to or from the parity memory cell, and an error correction unit correcting an error of the regular data, the operating method comprising:
- detecting and correcting, in a write operation, the error of the regular data read from the regular memory cells using the regular data read from the regular memory cells and the parity data read from the parity memory cell;
- generating replaced regular data by replacing a part of corrected regular data with write data, generating a parity write data using the replaced regular data, and writing the new parity data into the parity memory cell;
- generating regular access controls signal controlling the regular memory cells and the regular data control circuit to read the regular data from the regular memory cells and write the regular data into the regular memory cells when write commands are supplied;
- generating parity access control signals controlling the parity memory cell and the parity data control circuit to start a read of the parity data from the parity memory cell after the regular data starts to be read from the regular memory cells and during the read of the regular data; and
- generating the regular access control signals to read the regular data from the regular memory cells in response to a write command while the parity write data to be written into the parity memory cell is supplied to the parity memory cell.

11. The operating method of the semiconductor memory according to claim 10, further comprising:
- activating the regular access control signals for a first period in response to each of the write commands;
- activating the parity access control signals for a second period in response to the each of the write commands;
- activating a first parity access control signal among the parity access control signals after a first regular access control signal among the regular access control signals is activated and during an activation of a first regular access control signal; and
- activating, when the write commands are supplied, the first regular access control signal corresponding to the first parity access control signal in response to a following write command during the activation of the first parity access control signal.

12. The operating method of the semiconductor memory according to claim 11, further comprising
- setting a sum of a period from the activation of the first regular access control signal to the activation of the first parity access control signal and an activation period of the first parity access control signal longer than an interval of an activation timing of the first regular access control signal being activated when the write commands are continuously supplied.

13. The operating method of the semiconductor memory according to claim 11, further comprising:
- setting the activation period of the first regular access control signal and the activation period of the first parity access control signal in a mutually equivalent manner; and
- setting a period from the activation of the first regular access control signal to the activation of the first parity access control signal longer than an inactivation period of the first regular access control signal when the write commands are supplied.

14. The operating method of the semiconductor memory according to claim 11, further comprising:
- generating the regular access control signals in response to the write commands; and
- receiving the regular access control signals and generating the parity access control signals by delaying the received regular access control signals.

15. The operating method of the semiconductor memory according to claim 11, further comprising:
- generating the regular access control signals in response to the write commands;
- receiving the write commands and generating a parity write command by delaying the received write commands; and
- generating the parity access control signal in response to the parity write command.

16. A system comprising a semiconductor memory and a controller to control an access to the semiconductor memory, wherein
the semiconductor memory comprises:
- a plurality of regular memory cells to hold regular data written therein;
- a regular data control circuit to input or output the regular data to or from the regular memory cells;
- a parity memory cell to hold parity data of the regular data;
- a parity data control circuit to input or output the parity data to or from the parity memory cell;
- an error correction unit being coupled to the regular data control circuit and the parity data control circuit, to detect and correct an error of the regular data read from the regular memory cells using the regular data read from the regular memory cells and the parity data read from the parity memory cell in a write operation, to generate replaced regular data by replacing a part of corrected regular data with write data, to generate a parity write data using the replaced regular data, and to write the parity write data into the parity memory cell; and an access control circuit to generate regular access control signals to control the regular memory cells and the regular data control circuit to read the regular data from the regular memory cells and write the regular data into the regular memory cells when write commands are supplied, to generate parity access control signals to control the parity memory cell and the parity data control circuit to start a read of the parity data from the parity memory cell after the regular data starts to be read from the regular memory cells and during the read of the regular data, and to generate the regular access control signals to read the regular data from the regular memory cells in response to a following write command during the parity write data to be written into the parity memory cell is supplied to the parity memory cell.

17. The system according to claim 16, wherein the access control circuit, comprises:

a regular access control circuit to activate the regular access control signals for a first period in response to each of the write commands, and to activate, when the write commands are supplied, a first regular access control signal among the regular access control signals corresponding to a first parity access control signal in response to the following write command during an activation of the first parity access control signal among the parity access control signals; and a parity access control circuit to activate the parity access control signals for a second period in response to each of the write commands, and to activate the first parity access control signal after the first regular access control signal starts to be activated and during the activation of the first regular access control signal.

18. The system according to claim 17, wherein a sum of a period from the activation of the first regular access control signal to the activation of the first parity access control signal and an activation period of the first parity access control signal is set longer than an interval of an activation timing of the first regular access control signal being activated when the write commands are continuously supplied.

19. The system according to claim 17, wherein:

the activation period of the first regular access control signal and the activation period of the first parity access control signal are set to be equivalent to each other; and a period from the activation of the first regular access control signal to the activation of the first parity access control signal is set longer than an inactivation period of the first regular access control signal when the write commands are supplied.

20. The system according to claim 17, wherein the semiconductor memory further comprises:

a regular word line coupled to the regular memory cells; and a parity word line coupled to the parity memory cell, wherein:

the first regular access control signal is a regular word line signal to activate the regular word line; and the first parity access control signal is a parity word line signal to activate the parity word line.

* * * * *